Aug. 14, 1928.

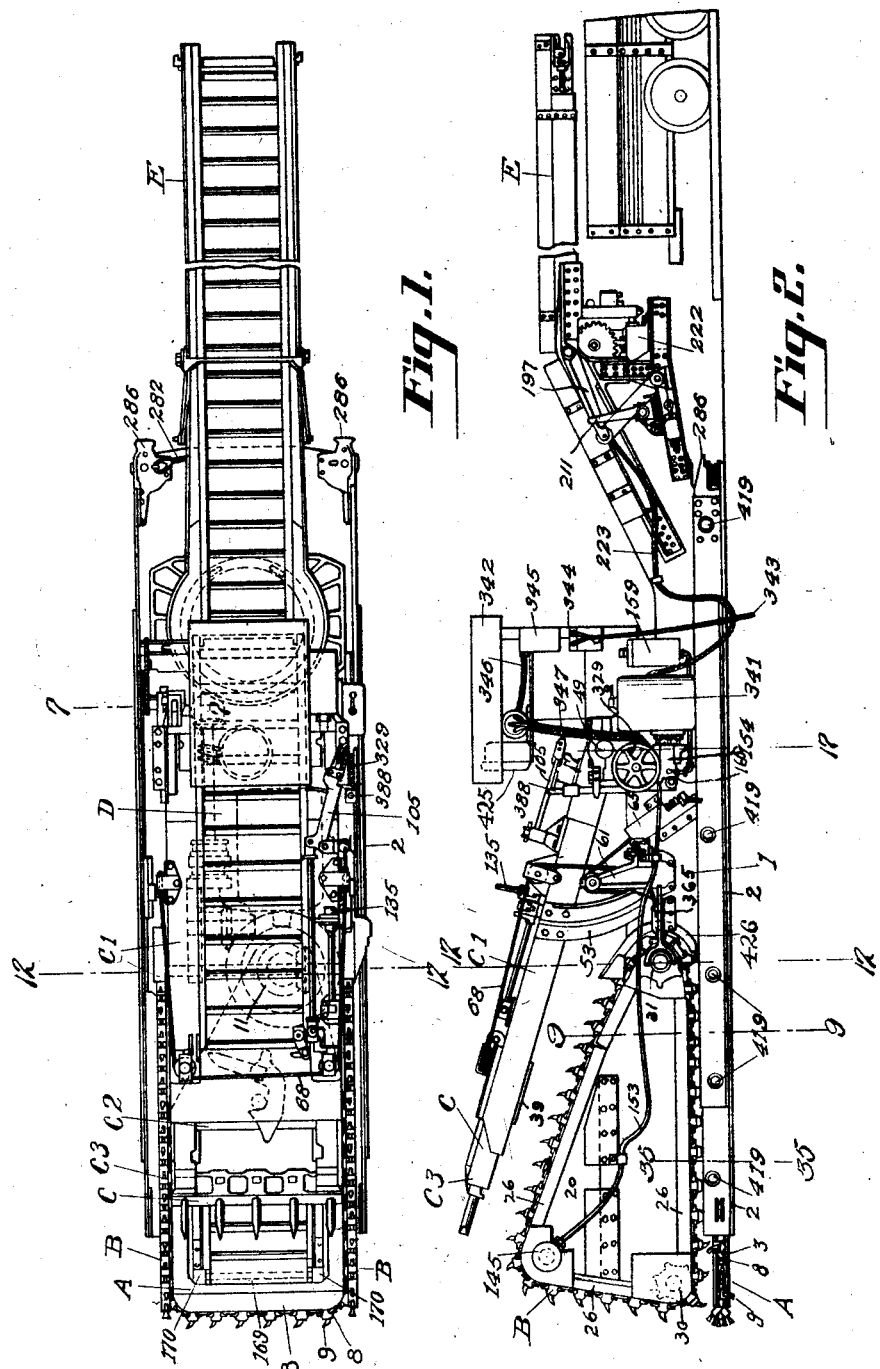

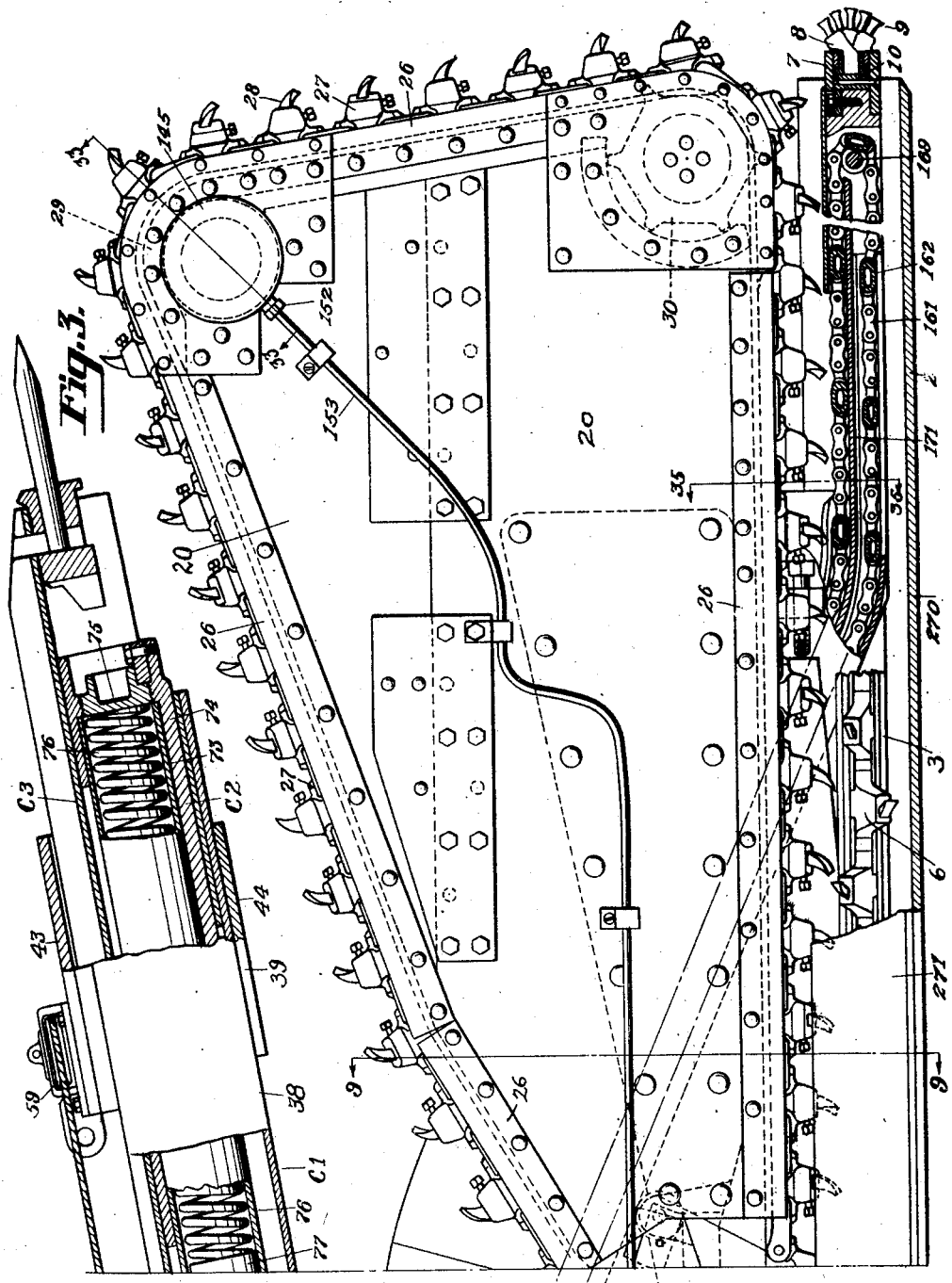

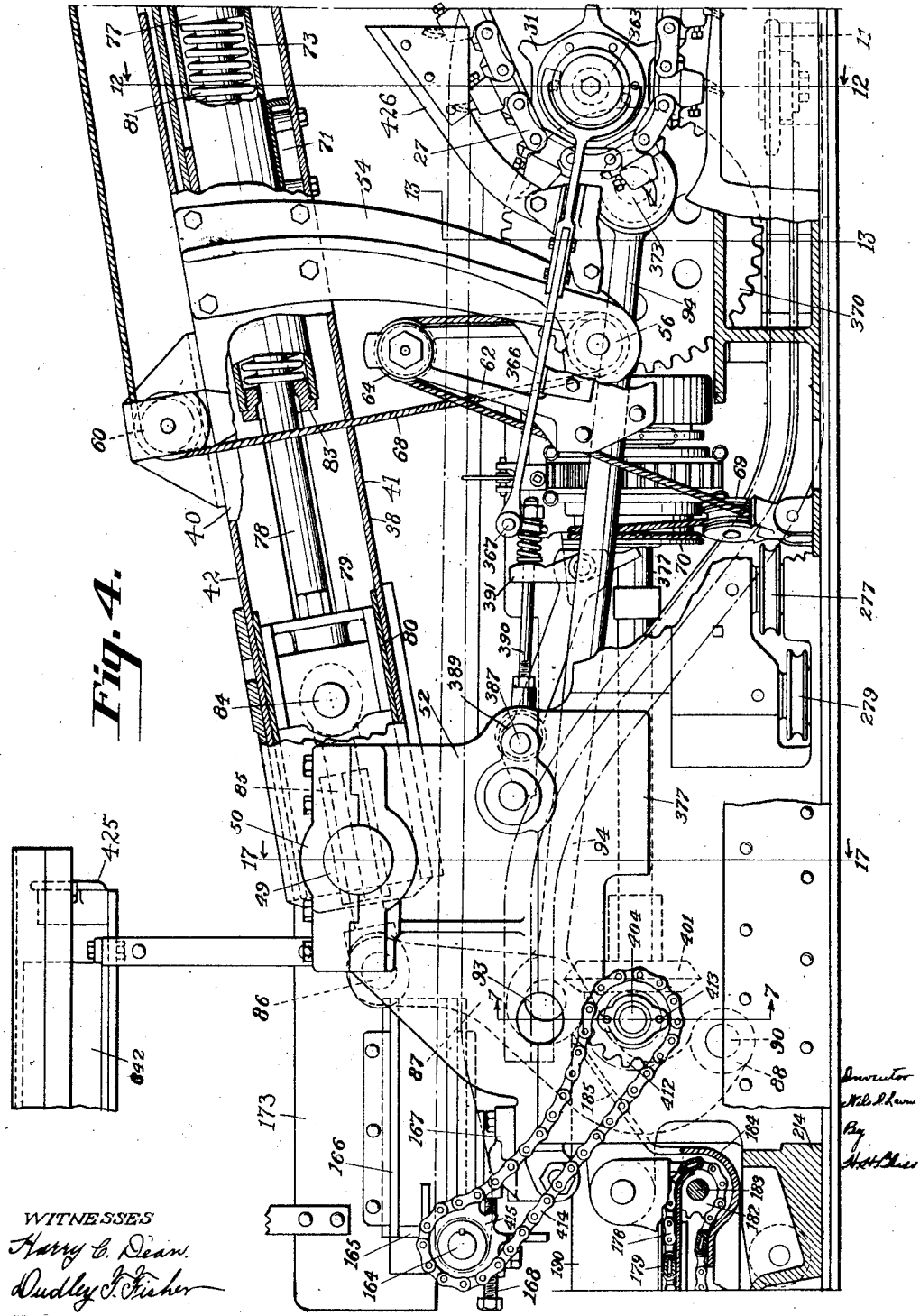

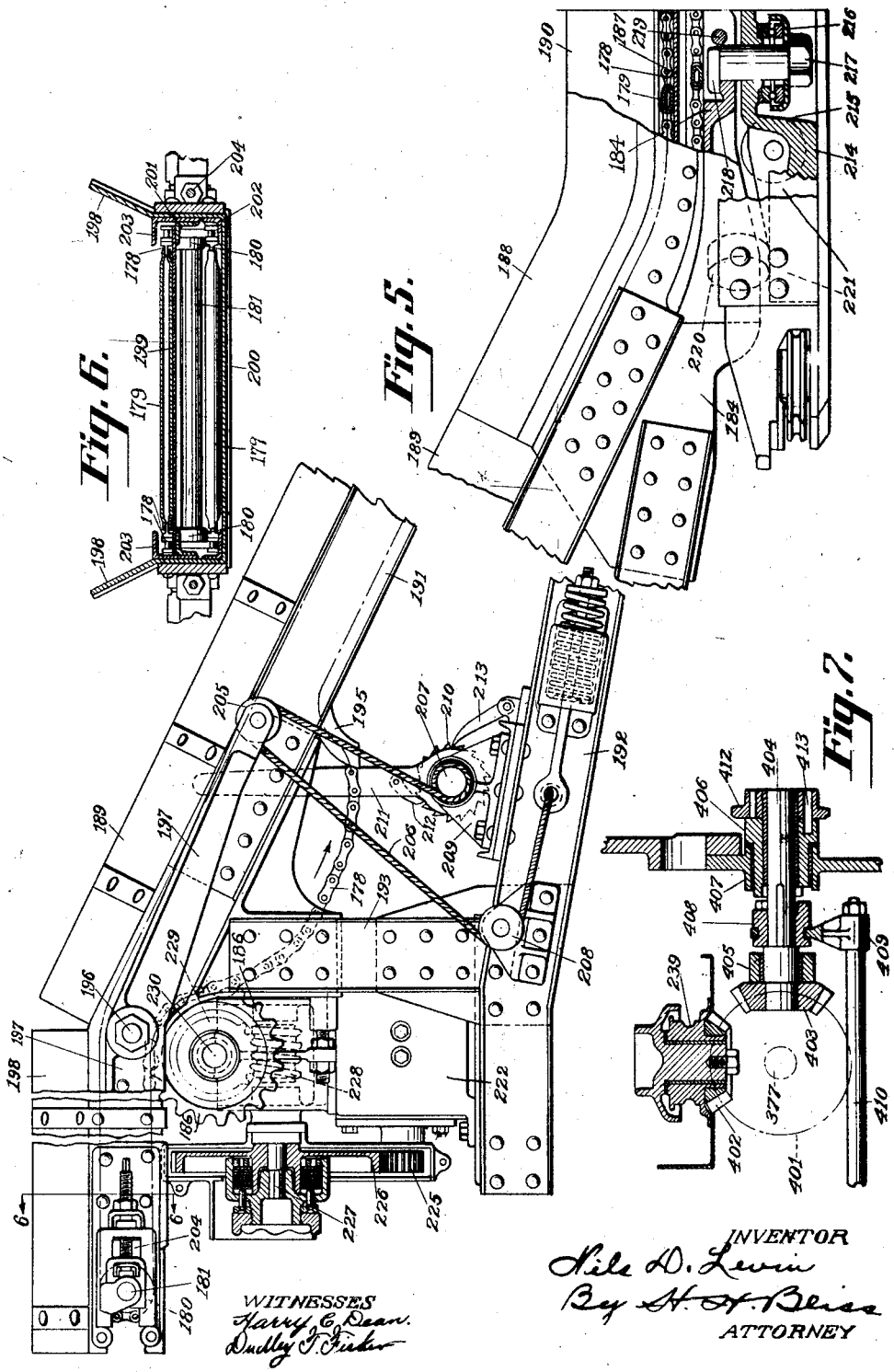

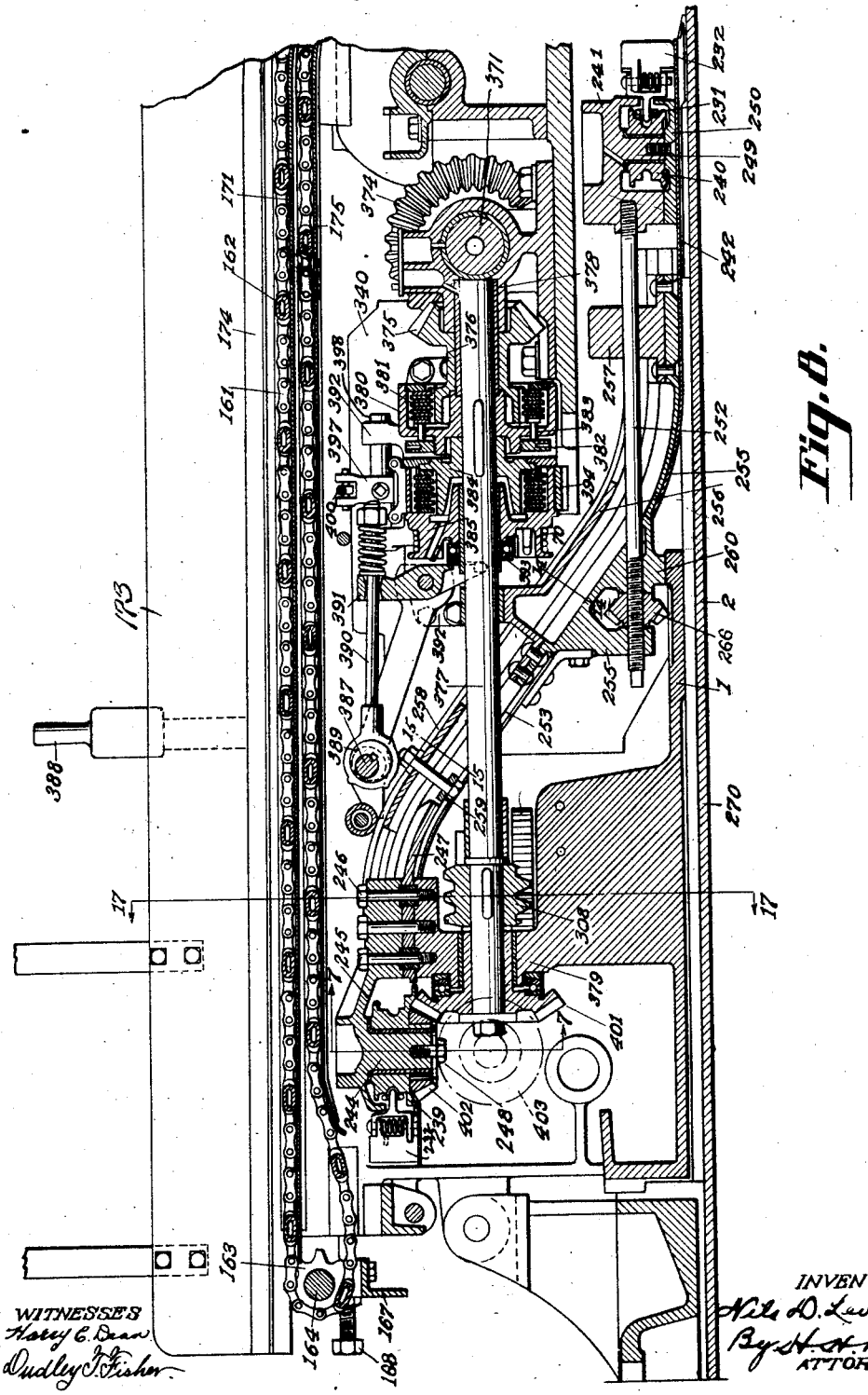

N. D. LEVIN 1,680,386

MINING MACHINE

Original Filed Aug. 7, 1917  16 Sheets-Sheet 6

WITNESSES
Harry C. Dean.
Dudley T. Fisher

INVENTOR
Nils D. Levin
By H. A. Beier
ATTORNEY

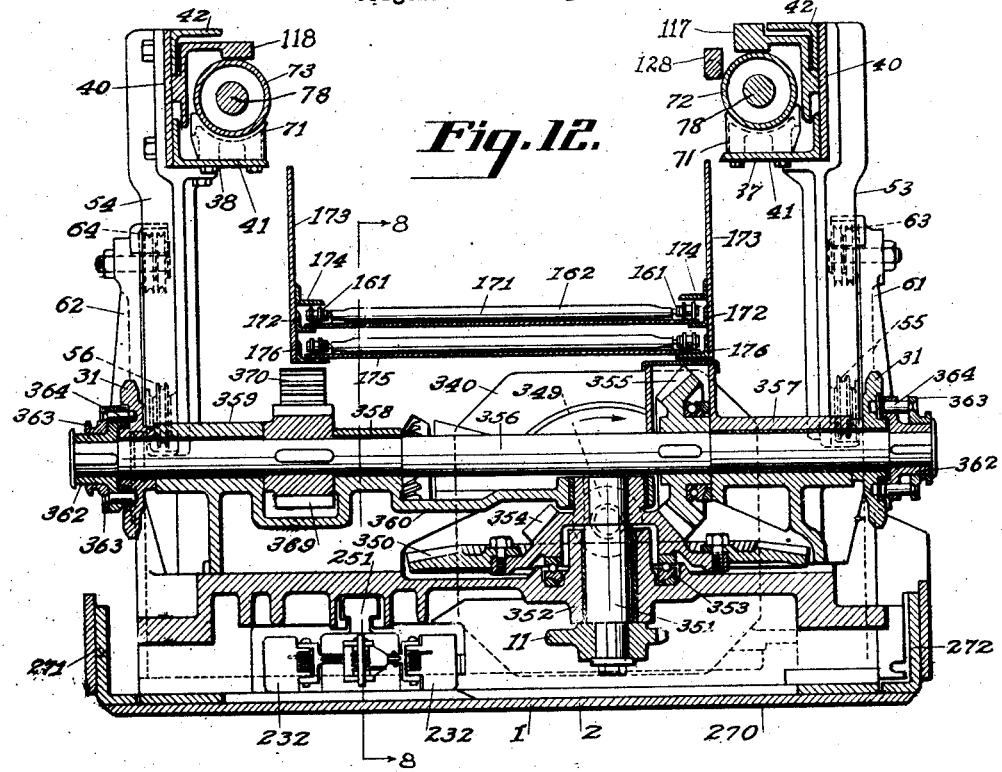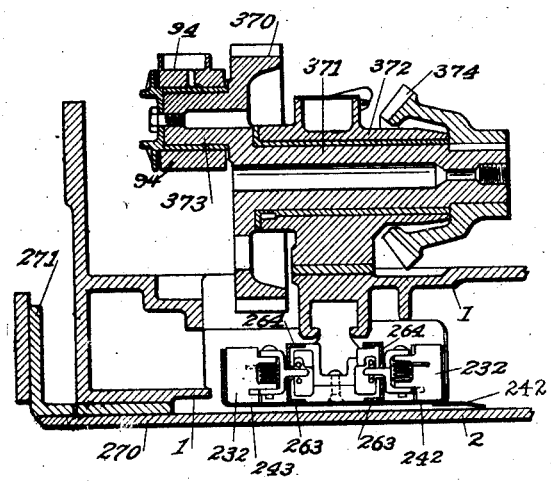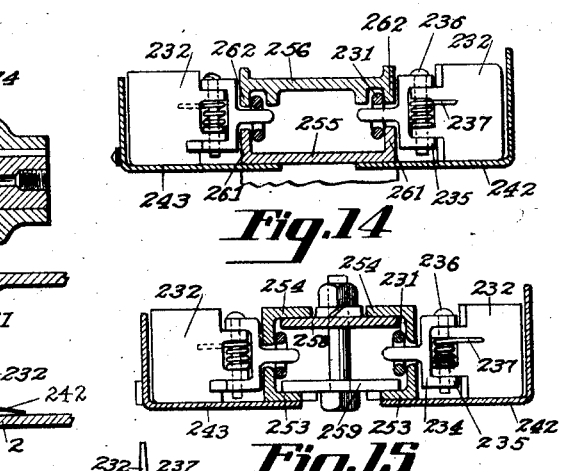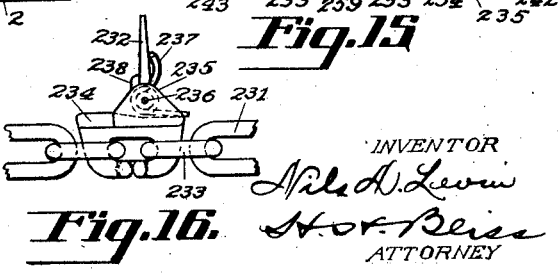

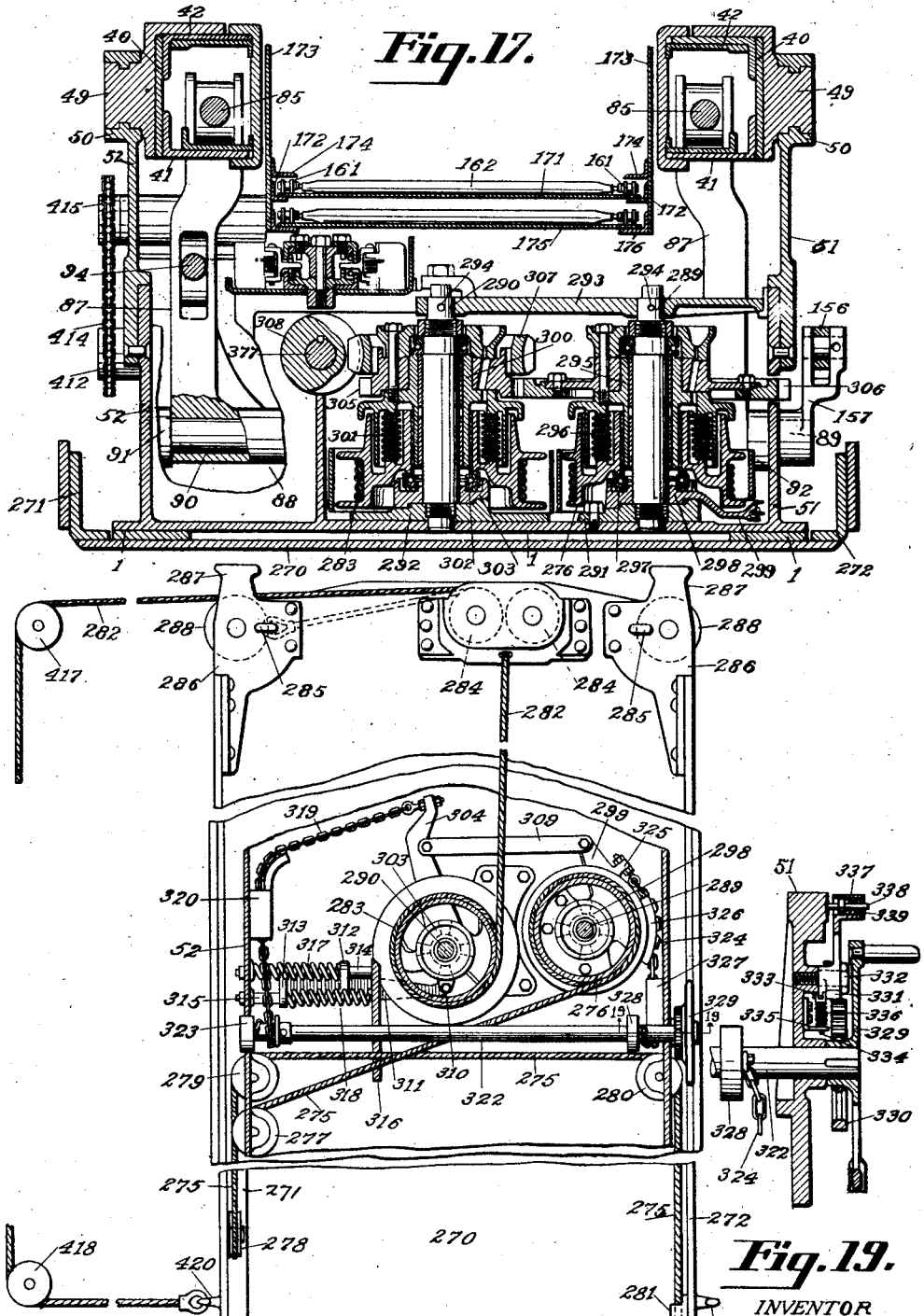

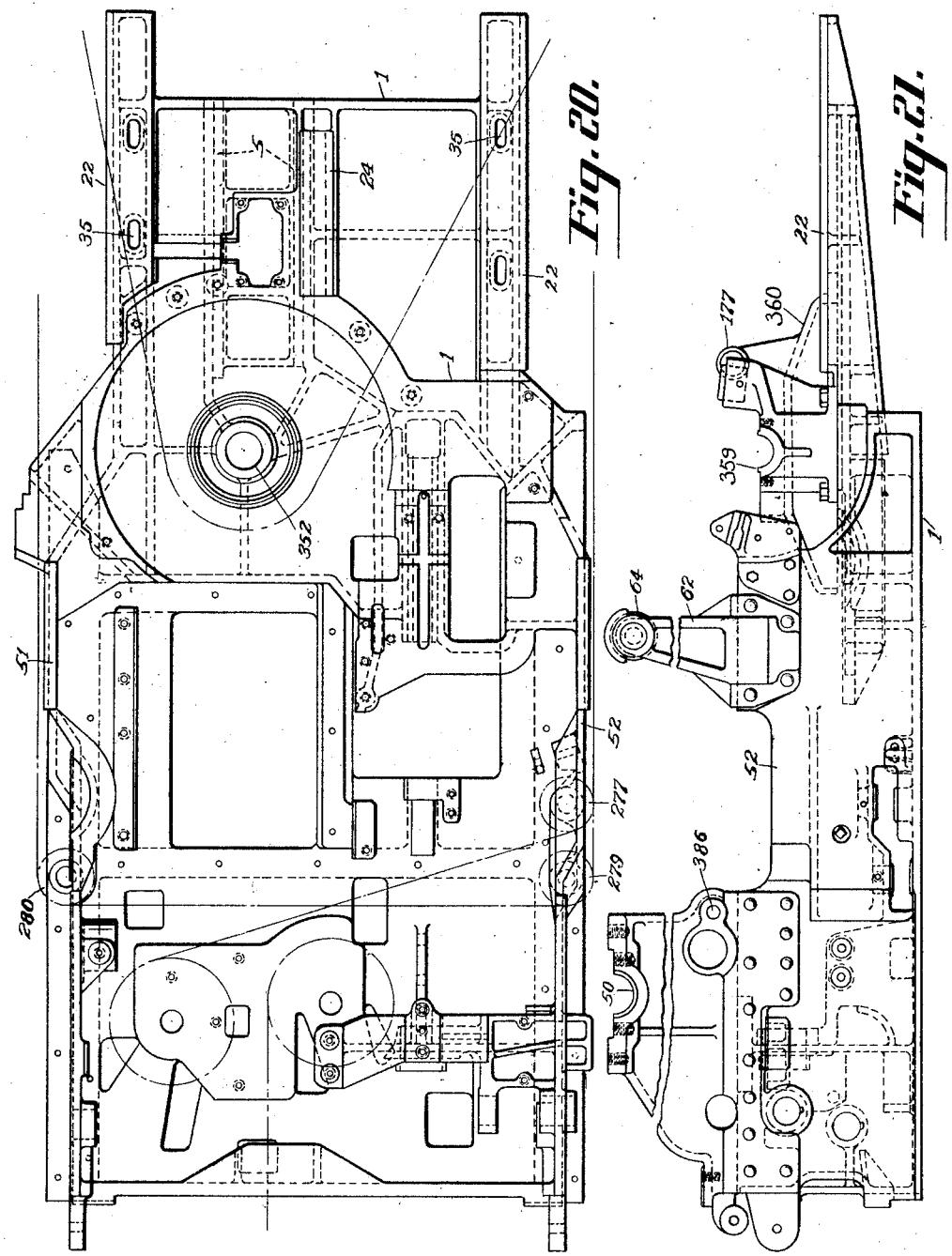

Aug. 14, 1928.
N. D. LEVIN
1,680,386
MINING MACHINE
Original Filed Aug. 7, 1917   16 Sheets-Sheet 10
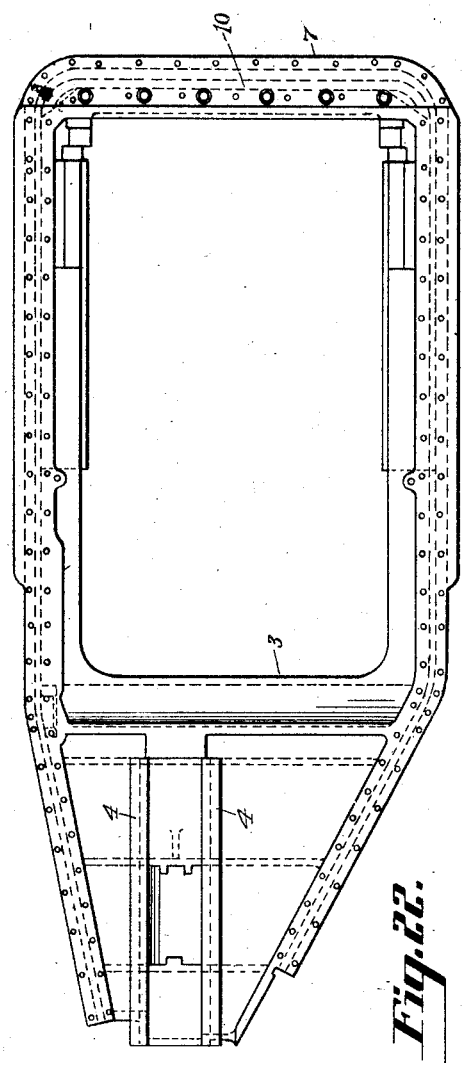
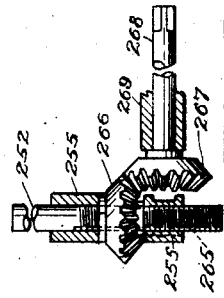
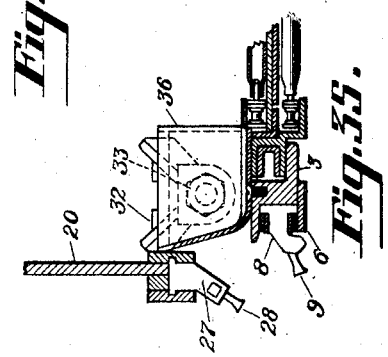
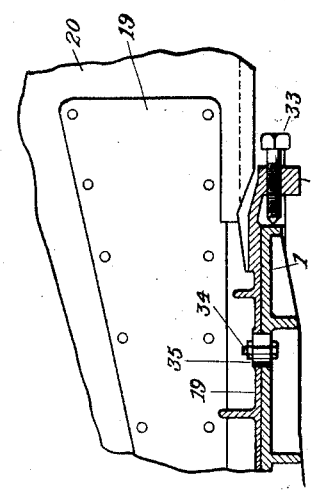
WITNESSES
Harry E. Dean.
Dudley F. Fisher.
INVENTOR
Niels D. Levin
By H. H. Bein
ATTORNEY Aug. 14, 1928.
N. D. LEVIN
1,680,386
MINING MACHINE
Original Filed Aug. 7, 1917    16 Sheets-Sheet 11
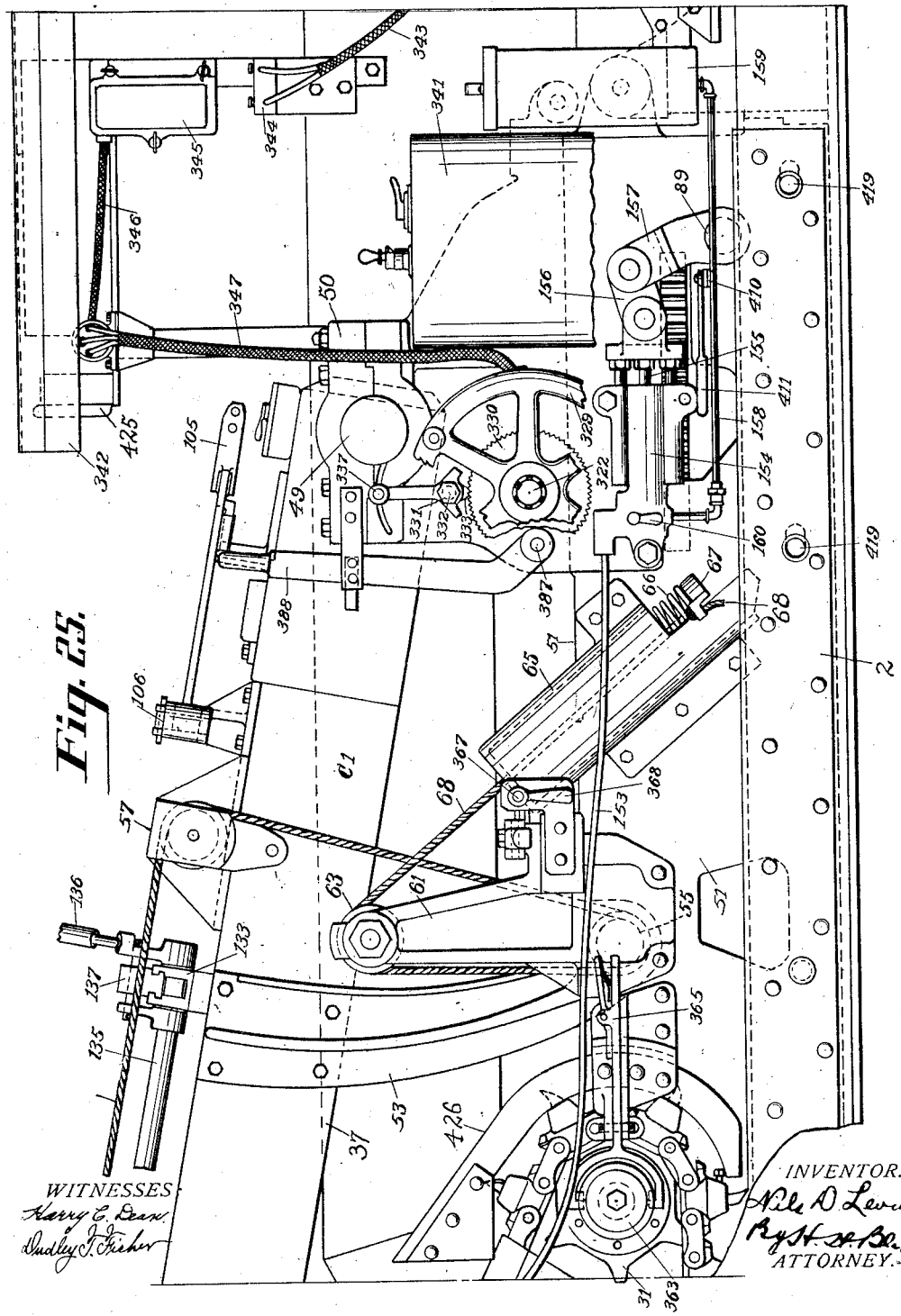

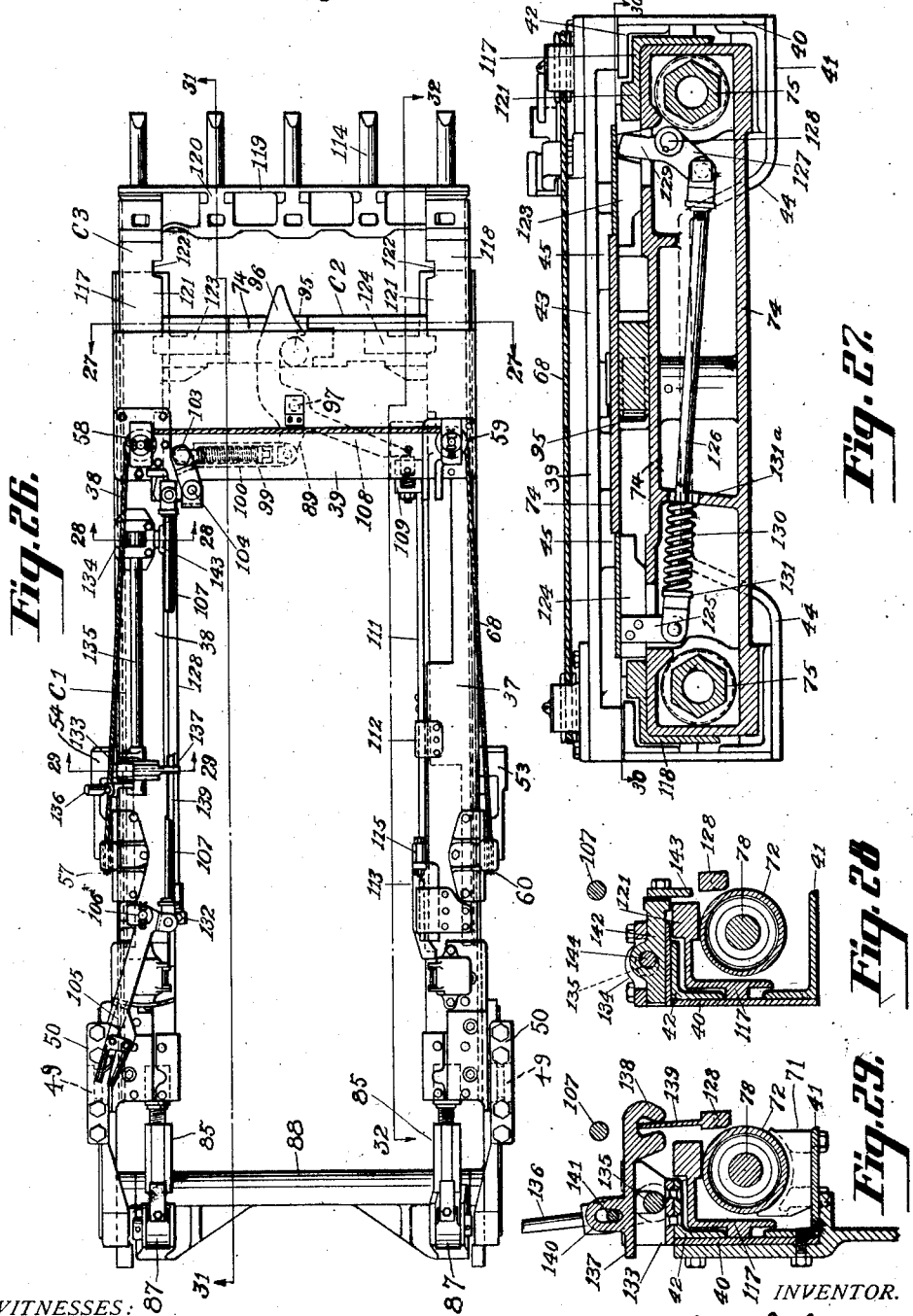

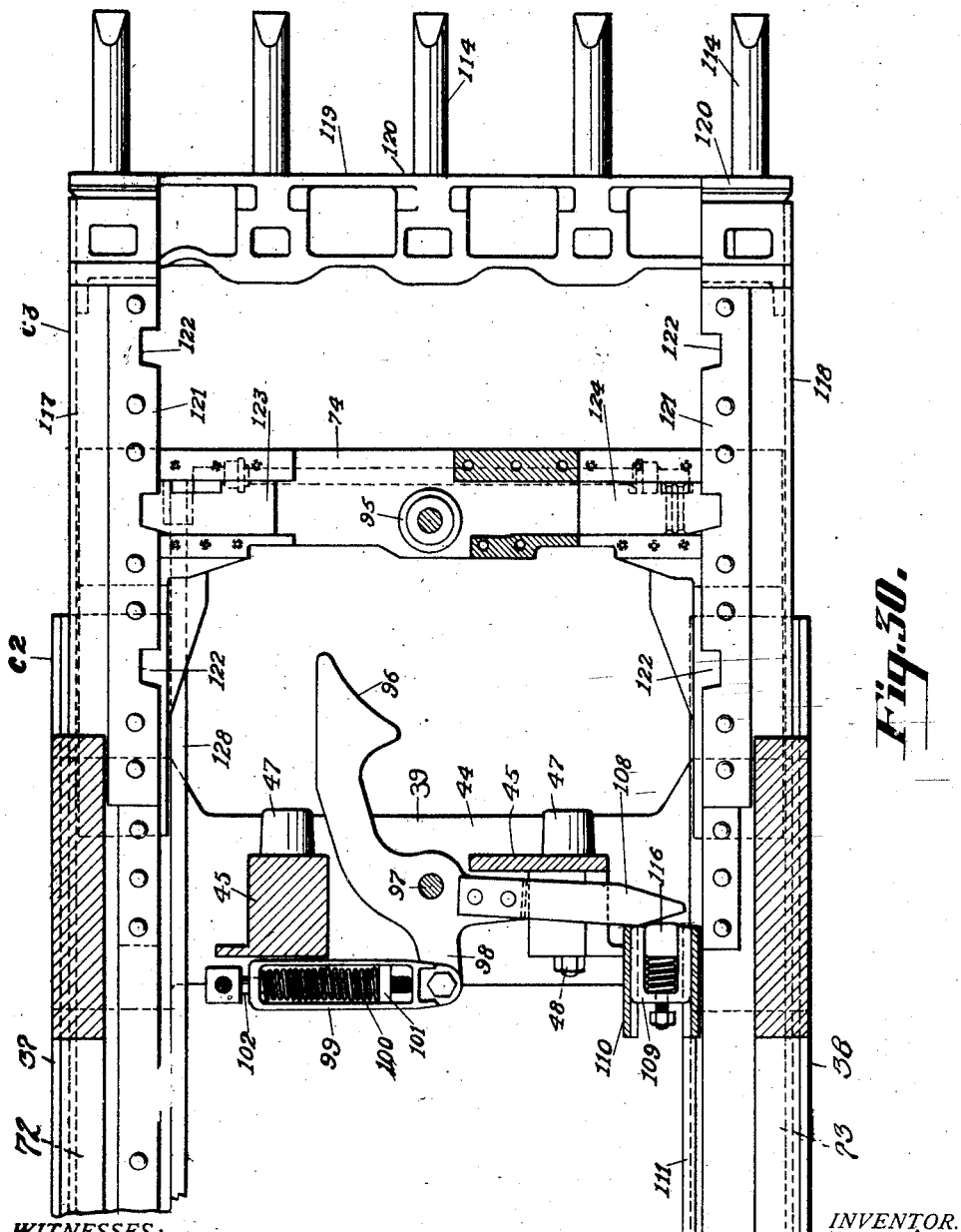

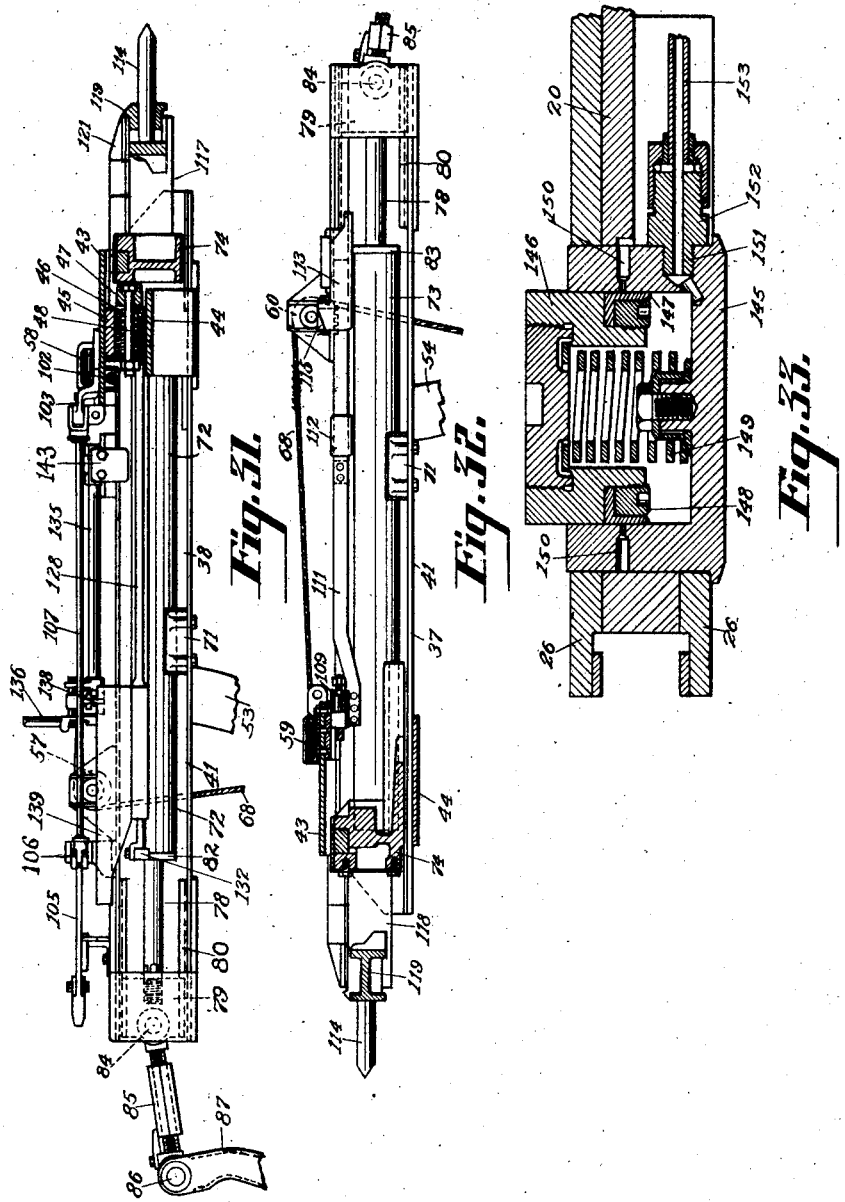

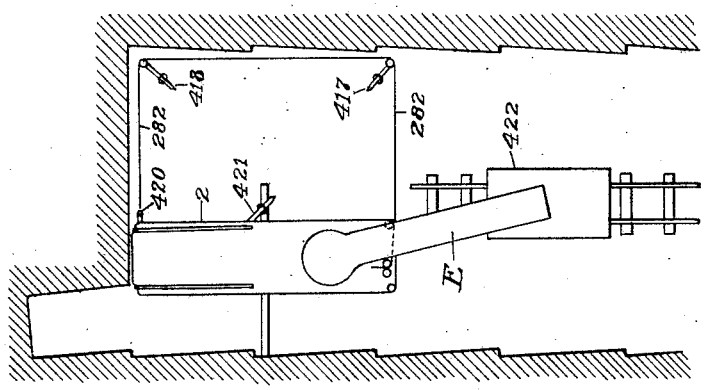
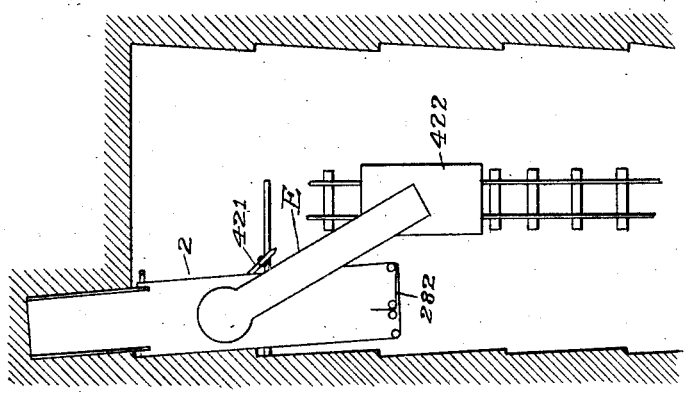
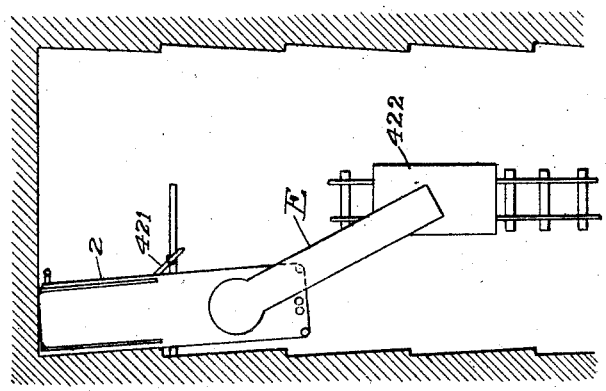

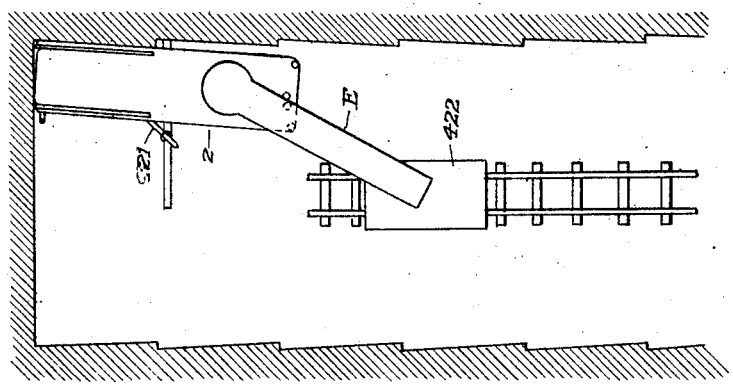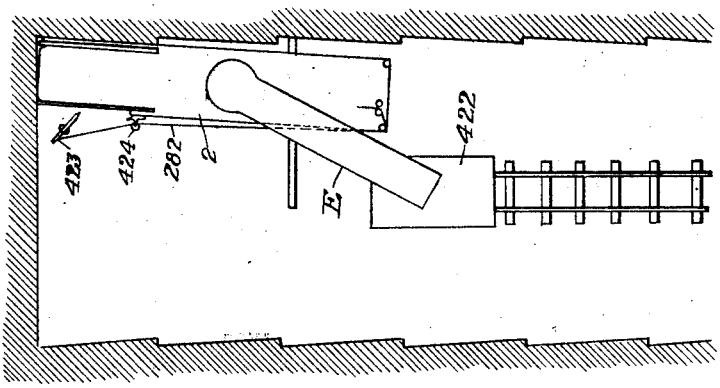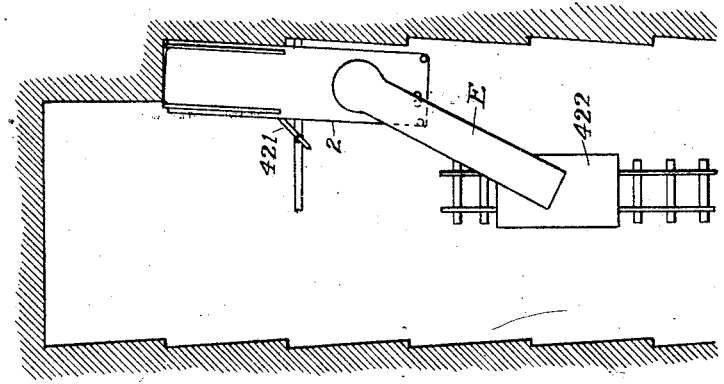

Patented Aug. 14, 1928.

1,680,386

UNITED STATES PATENT OFFICE.

NILS D. LEVIN, OF COLUMBUS, OHIO, ASSIGNOR TO THE JEFFREY MANUFACTURING COMPANY, OF COLUMBUS, OHIO, A CORPORATION OF OHIO.

MINING MACHINE.

Application filed August 7, 1917, Serial No. 184,946. Renewed December 19, 1924.

The present invention relates to certain new and useful improvements in mining machines of the type adapted for undercutting the coal, breaking it down, and loading it into cars for transportation from the mine.

I am aware that it has been heretofore proposed to provide, in a cutting and loading machine, simultaneously acting horizontal undercutting devices and parallel vertical shearing devices; to provide breaking down devices; to provide a car loading conveyer which is pivoted to the main frame for movement about a vertical axis; and to provide ropes and cables associated with winding drums for moving the machine as a whole. None of the foregoing features are broadly claimed as a part of this invention.

It is the especial object of this invention to provide, in a machine of the class described, improved reciprocating pick mechanism adapted to engage the coal to break it down for transportation from the mine.

It is a further object of this invention to provide auxiliary pressure exerting devices adapted to co-operate with the pick mechanism to more effectively break down the coal.

It is a further object to provide improved regulating and controlling devices whereby the various elements of the machine may be conveniently and efficiently controlled.

These and other objects will appear in the following specification wherein is disclosed the preferred embodiment of my invention, reference being had to the accompanying drawings of which Fig. 1 is a general plan view of the preferred embodiment of my invention.

Fig. 2 is a general side elevation of the left hand side of the machine illustrated in Fig. 1.

Fig. 3 is an enlarged elevational view of the forward part of the right hand side of the machine, certain parts being broken away to disclose other parts.

Fig. 4 is an enlarged elevational view of the central part of the right hand side of the machine, certain parts being broken away to reveal other parts.

Fig. 5 is an enlarged elevational view of the rearward part of the right hand side of the machine certain parts being broken away to reveal other parts.

Fig. 6 is a transverse sectional view of the loading conveyer taken along the line 6—6 of Fig. 5.

Fig. 7 is a fragmentary transverse sectional view taken along the line 7—7 on Figs. 1 and 4.

Fig. 8 is a vertical longitudinal sectional view of the machine taken along the line 8—8 of Figs. 12 and 17.

Fig. 12 is a cross section taken along the line 12—12 on Figs. 2 and 4.

Fig. 13 is a fragmentary cross sectional view taken along the line 13—13 of Fig. 4.

Fig. 14 is a fragmentary sectional view taken along the line 14—14 of Fig. 8.

Fig. 15 is a fragmentary cross sectional view taken along the line 15—15 of Fig. 8.

Fig. 16 is a detail of the chain and scraper used with the slack conveyer.

Fig. 17 is a cross section taken along the line 17—17 on Figs. 2, 4 and 8.

Fig. 18 is a diagrammatic plan view showing the feeding mechanism, the other parts being removed for the sake of clearness.

Fig. 19 is a fragmentary sectional view along the line 19—19 of Fig. 18.

Fig. 20 is a plan view of the main frame castings.

Fig. 21 is a side view of the main frame castings.

Fig. 22 is a plan view of the cast steel frame for the horizontal undercutting mechanism.

Fig. 23 is a side view of the cast steel frame of the horizontal undercutting mechanism.

Fig. 24 is a diagrammatic plan view showing a detail of the adjusting mechanism by which the tension of the slack conveyer chain is regulated.

Fig. 25 is an enlarged side elevation of the central part of the left hand side of the machine.

Fig. 26 is a plan view of the reciprocating pick mechanism, other parts being omitted for the sake of clearness.

Fig. 27 is a vertical cross sectional view taken along the line 27—27 of Fig. 26.

Fig. 28 is a cross section taken along the line 28—28 of Fig. 26.

Fig. 29 is a cross section taken along the line 29—29 of Fig. 26.

Fig. 30 is a fragmentary plan view of the front end of the pick mechanism partly in sections the section being taken along the line 30—30 of Fig. 27.

Fig. 31 is a longitudinal section taken along the line 31—31 of Fig. 26.

Fig. 32 is a longitudinal section taken along the line 32—32 of Fig. 26.

Fig. 33 is an enlarged cross sectional view taken along the line 33—33 of Fig. 3.

Fig. 34 is a fragmentary longitudinal sectional view taken along the line 34—34 of Fig. 9.

Fig. 35 is a fragmentary cross sectional view taken along the line 35—35 on Figs. 2 and 3.

Figs. 36, 37, 38, 39, 40, and 41 are diagrammatic plan views showing the method of operating the machine in the room of a mine.

Like numerals refer to similar parts in the several figures.

Stated very briefly this machine comprises five principal parts. These are the undercutting mechanism, indicated in Figs. 1 and 2 by A; the vertical shearing devices B and B; the breaking down mechanism C; the primary conveyer D, and the secondary loading conveyer E.

These principal parts are co-operatively connected together and are mounted upon the frame 1 which is shown in detail in Figs. 20 and 21. This main frame is supported upon a pan or shoe 2 which rests directly upon the floor of the mine and is movable longitudinally thereof in a manner and for a purpose to be hereinafter described.

Figure 9:
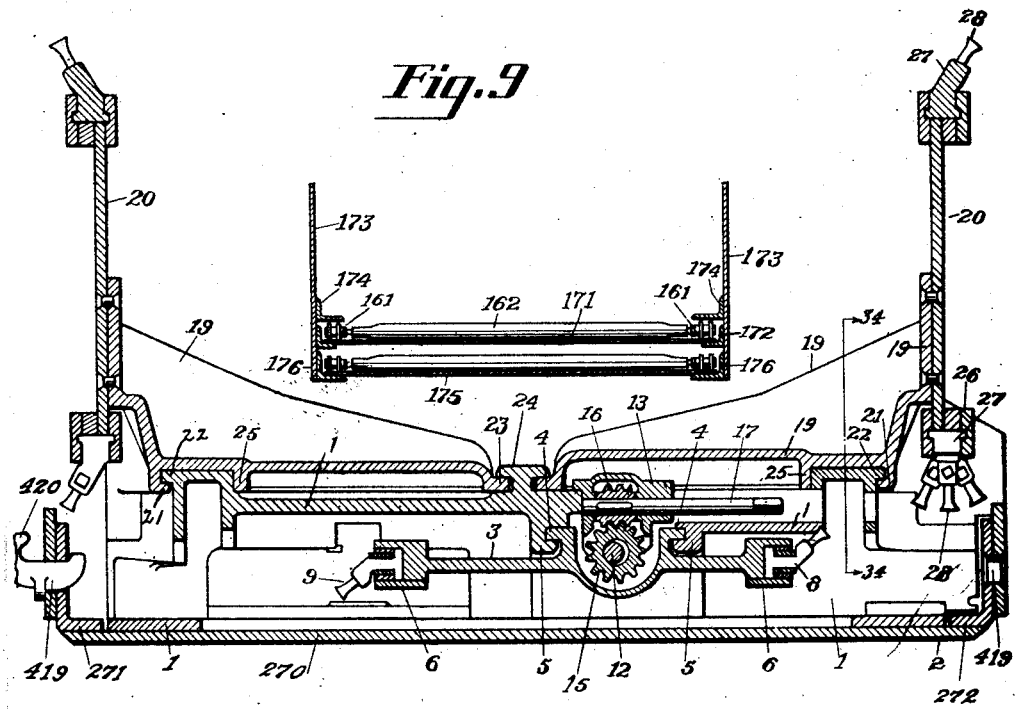
Fig. 9 is a vertical cross section taken along the line 9—9 on Figs. 2 and 3.

Supported upon the main frame 1 is a relatively movable cutter frame 3, shown in detail in Figs. 22 and 23, which is preferably formed of cast steel. As shown in Fig. 9 this cutter frame 3 is provided with horizontal flanges 4 slidably engaging suitable guide flanges 5 formed on the underside of the main horizontal wall of the frame casting 1 to support said cutter frame. Attached to the cutter frame 3 along each of its sides are guide plates 6 and across its forward end are similar plates 7 which form a chain groove adapted to receive and guide the endless chain 8 to which are attached the renewable cutter bits 9. At the front end of the cutter frame 3 the chain passes over a hardened wearing plate 10 and at the rear it passes around and is engaged by the driving sprocket wheel 11 which is mounted in the main frame to receive power in a manner to be hereinafter described.

Figure 10:
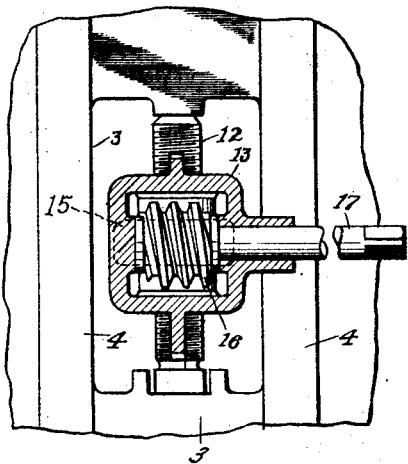
Fig. 10 is a fragmentary plan view partly in sections showing the mechanism for adjusting the tension of the cutting chain of the undercutting mechanism.

As before stated the cutter frame 3 is slidable longitudinally with respect to the main frame 1. This adjustment of the cutter frame is for the purpose of regulating the tension of the cutter chain. The adjusting mechanism is clearly shown in Figs. 9 and 10. In the cutter frame 3 there is formed a recess in which is rigidly mounted a screw 12. A bracket 13, which is secured to the frame 1, has depending arms with apertures through which the screw 12 loosely passes. 15 is a combined nut and worm wheel mounted on the screw 12 between the depending arms of the bracket 13, and this worm wheel is engaged by the worm 16 attached to a shaft 17 journaled in apertures of the bracket 13. The end of the shaft 17 is squared to receive a socket wrench by means of which an operator at the side of the machine can move the parts which have been described, and can by means of them move the cutter frame 3 longitudinally with respect to the main frame 1, thereby tightening or loosening the cutter chain 8.

Positioned at opposite sides of the main frame 1 and longitudinally slidable thereon are brackets 19, 19 to which are secured the vertical cutter frame plates 20, 20. These parts are clearly shown in Figs. 9 and 34. Each of the brackets 19 has at its outer edge a flange 21 engaging a rib 22 on the main frame, and at its inner edge a flange 23 engaging a rib 24 on the main frame. At 25 there is on each bracket a downward extending rib which engages a vertical wall of the main frame. It will be clear that by means of the flanges or ribs 21, 23 and 25 the brackets 19, 19 and consequently the plates 20, 20 are held against lateral or vertical movement, at the same time being free for longitudinal movement within certain limits. As shown in Fig. 3 the plates 20, 20 are substantially triangular in outline and have, attached along their edges, guide strips 26 which form the chain groove in which travels the endless cutter chains 27. To these cutter chains 27 are secured in the usual manner the renewable cutter bits 28 by which the coal is sheared. At the upper forward corners of the plates 20, 20 are provided hardened steel wearing strips 29 over which the chains 27 slide to change their direction while at the lower forward corners sprocket wheels 30 are provided for the same purpose. To the rear of the plates 20 the chains 27 pass over sprocket wheels 31 which are mounted on the main frame to receive power in a manner to be hereinafter described. Provision is made for the adjustment of the tension of the cutter chains 27 by the longitudinal movement of the cutter frames 20 relative to the main frame 1 as illustrated in Figs. 9 and 34. Mounted in a bracket 32 secured to the bracket 19 is a screw 33 arranged to engage with the forward end of the main frame 1. By turning the screw 33 the brackets 19 and plates 20 can be moved forward to tension the chain 27 and the brackets can be locked in adjusted position by means of the bolts 34 which extend through the brackets and through slots 35 in the main frame casting.

Attached to the cutter frame 3 are protecting plates 36 which extend above the cutters 9 and contact with the plates 20 of the shearing cutter frame. These plates 36 are clearly shown in Fig. 35 and serve to prevent pieces of coal from becoming jammed between the cutter bits of the two chains to damage the machine.

The mechanism for breaking down the coal above the undercutting mechanism and between the shearing mechanisms, as before stated, is indicated as a whole by the letter C. It comprises a main vertically oscillatory U shaped frame work $C^1$ in which is longitudinally slidable a secondary U shaped frame work $C^2$ upon which is longitudinally adjustable a tertiary U shaped frame $C^3$ to which the pick bits are removably attached. The frame $C^1$ is made up of two longitudinal legs 37 and 38 arranged one at either side of the machine, and joined together at their forward ends by a cross member 39. These longitudinal legs 37 and 38 are built up of steel plates 40 and angle bars 41 and 42 which are joined together in any preferred manner such as by electric welding, and the cross member 39 is preferably built up of the steel plates 43 and 44 between which are secured the steel blocks 45, 45. The blocks 45 are recessed to contain the compression springs 46 against which bear the buffer blocks 47. The buffer blocks 47 are held in place by longitudinally slidable retaining bolts 48 extending through the blocks 45. As shown in Figs. 4 and 17, the legs 37 and 38 are provided at their rear ends with trunnions 49—49 which are journaled in bearings 50—50 of the upstanding parts 51 and 52 of the machine frame. Bolted to the legs 37 and 38 are downwardly projecting arms 53 and 54 which have at their lower ends the rope sheaves 55 and 56 respectively. Other rope sheaves 57, 58, 59 and 60 are mounted in suitable supports attached to the arms 37 and 38. Bolted to the upstanding parts 51 and 52 of the main frame, adjacent the arms 53 and 54, are brackets 61 and 62 having at their upper ends the rope sheaves 63 and 64 respectively. On the left hand side of the machine a cylinder 65 is bolted to the upstanding part 51 near the bracket 61. Within the cylinder 65 is mounted a compression spring 66 the lower end of which is engaged by an abutment plate 67 to which is attached one end of the rope 68. The rope 68 extends upwardly through the center of the spring 66 and through an aperture in the upper end of the cylinder and passes upward around the sheaves 63, downward around the sheave 55, upward and around the sheaves 57, 58, 59 and 60, downward around the sheave 56 upward around the sheave 64 downward around the sheave 69 mounted in the main frame of the machine and is attached to and windable upon a winding drum 70 which is mounted in a manner to be hereinafter described. By the winding of the rope 68 upon the drum 70 the frame $C^1$ will be oscillated upon the trunnions 49 to elevate the pick mechanism, and the spring 66 provides the resiliency necessary to relieve the parts from the shocks which are incident to the operation.

Slidable in bearings 71 of the legs 37 and 38 are the tubes 72 and 73 the forward ends of which are connected together by the cross member 74 to form the secondary U shaped frame $C^2$. The openings in the forward ends of the tubes 72 and 73 are closed by screw threaded plugs 75 against which abut the springs 76 which are contained within the tubes. The rear ends of the springs 76 abut against piston heads 77 which are secured to the piston rods 78 and are slidable within the tubes. At their rear ends the piston rods are secured to the cross heads 79 which are slidable in the guide ways 80 of the legs 37 and 38. Springs 81 are interposed between the rear sides of the piston head 77 and the ring castings 82 and 83 which are screw threaded into the rear ends of the tubes. Connected to the cross heads 79 by means of wrist pins 84 are connecting rods 85 the rear ends of which are connected by suitable pins 86 with the rocker arms 87. The rocker arms 87 are connected together at their lower ends by a cross member 88 in which is fixed the trunnions 89 and 90 which support the rocker arms in bearings 91 and 92 of the upstanding parts 51 and 52 of the machine frame. The rocker arm at the right hand side of the machine is connected at 93 with the connecting rod 94 through which power is received to oscillate the pistons 77. When the pistons 77 move rearwardly they cause the springs 81 to press upon the ring castings 82 and 83 to move the secondary frame $C^2$ rearwardly relative to the frame $C^1$. As the cross member 74 reaches the rearward limit of its travel contact is made with the buffer block 47 which arrests further movement in that direction, the springs 46 acting to relieve the machine from undue shock.

Mounted in the cross member 74 is a roller 95 which is adapted to be engaged by a hook 96 to prevent forward movement of the frame $C^2$. The hook 96 is pivotally attached to the cross members 39 by a pivot pin 97. Formed on the hook 96 is a lug 98 to which is connected a clevis 99. Within the clevis is contained a spring 100 which is engaged by the nut 101 threaded to the rod 102. The rod 102 is connected to a rocker arm 103 pivotally mounted at 104 upon the cross member 39. When the rocker arm 103 is in one position the compression spring 100 is compressed and tends to move the hook 96 into position to engage the roller 95. When the rocker arm 103 is in its other position the hook 96 is held out of contact with the roller 95. A hand lever 105 pivotally mounted at 106 upon the leg 37, and connected by the rod 107 with the rocker arm 103 affords means to control the position of the rocker arm and the consequent action of the hook 96. Attached to the hook 96 is a laterally extending arm 108 adapted to contact with a slide block 109 mounted in a guide casting 110 attached to the cross member 39. Attached to the slide block 109 is a rearwardly extending rod 111 supported in side ways 112 secured to the leg 38. Fixed to the rear end of the rod 111 is a casting 113 which is adapted to contact with the cross head 79 as it nears the forward extremity of its travel. When the rocker arm 87 moves forward the piston 77 presses upon the spring 76 and, the cross member 74 being held against forward movement, compresses said springs. By the contact of the cross head 79 with the castings 113 the rod 111 is pushed forward causing the slide block 109 to engage with the arm 108 to rotate the hook 96 about its pivot pin 97. The cross member 74 being thus released from the hook 96, is driven forcibly forward by the energy stored in the springs 76 to cause the picks 114 to strike the coal and break it down. When for any reason the picks do not reach the coal the inertia of the parts tends to carry them forward, and this forward movement is checked before injury results to the machine by the compression of the springs 81. Means is provided at 115 for the adjustment of the casting 113 relative to the slide rod 111 to properly time contact with the cross head 79. A spring buffer 116 within the slide block 109 engages the hook arm 108 to relieve the parts from shock.

Interposed between the tubes 72 and 73 and the legs 37 and 38 are angle bars 117 and 118 the forward ends of which are joined together by the cross member 119 forming the tertiary U shaped frame $C^3$ which is longitudinally movable relative to both of the frames $C^1$ and $C^2$. The cross member 119 is provided with a plurality of sockets 120 into which the pick bits 114 are removably secured. Formed along the inner edges of the horizontally projecting flanges 121 of the angle bars 117 and 118 are a plurality of notches 122 which are adapted to be engaged by the latch bolts 123 and 124 to lock the frame $C^3$ against movement relative to the frame $C^2$. The latch bolt 124 is slidable in a guide way of the cross member 74 and has a depending lug 125 to which is connected the connecting rod 126. At its other end the connecting rod 126 is connected to the downwardly extending rocker arm 127 attached to the rocker shaft 128. The latch bolt 123 is slidable in a guide way of the cross member 74 and is recessed to engage the upwardly extending rocker arm 129 attached to the rocker shaft 128. By the rotation of the rocker shaft in one direction the latch bolts 123 and 124 are moved outwardly to engage the notches 122, and by its rotation in the other direction both latch bolts are moved inwardly to be disengaged from said notches. A compression spring 130 is arranged to engage a shoulder 131 upon the connecting rod 126 and a flange 131a of the cross member 74 and tends to rotate the rocker arms to cause the engagement of the latch bolts. The rocker shaft 128 extends longitudinally of the tube 72, is journaled at its forward end in an aperture of the cross member 74, and is journaled at its rearward end in a bearing bracket 132 which is formed on the screw ring castings 82 attached to the rear end of the tube 72.

Journaled in apertures of the castings 133 and 134 which are attached to the leg 38 is a rocker shaft 135 to which is attached an upstanding hand lever 136 by which the said shaft may be rotated. Mounted in a slide way of the casting 133 is a slide block 137 having downwardly extending fingers 138 which engage an upstanding flange 139 formed along the rearward portion of the rocker shaft 128. The slide block 137 is provided with a lug 140 having an aperture into which extends the crank pin 141 which is attached to the hand lever 136. Mounted in a slide way of the casting 134 is a slide block 142 having a downwardly extending flange 143 adapted to contact with the inner edge of the horizontal flange 121 of the angle bar 117 to act as a friction brake to resist movement of the frame $C^3$ relative to the frame $C^1$. The slide block 142 has an aperture which engages an eccentric 144 formed on the shaft 135. By the movement of the hand lever 136 in one direction the slide block 137 is moved to rotate the rocker shaft 128 in a direction to disengage the latch bolts 123 and 124, and at the same time the brake flange 143 is moved to contact with the angle bar 117. By the rotation of the hand lever 136 in the opposite direction the slide block 137 will cause the rotation of the rocker shaft 128 in a direction to cause the engagement of the latch bolts 123 and 124 and at the same time the flange 143 will be moved away from the angle bar 117. When the hand lever 136 is held in a central or neutral position both the latch bolts 123 and 124 and the brake flange 143 will be held inoperative. The flange 139 is longitudinally slidable between the fingers 138, its length being such that these parts remain in operative relation in all positions of adjustment.

Under some conditions it is found to be difficult to fracture the coal by the pick mechanism and I have provided auxiliary devices, shown in Figs. 3, 25 and 33, to assist in breaking down the coal. These auxiliary devices comprise hydraulic jacks, mounted one in each of the shearing cutter frames, adapted to be carried into the vertical kerfs and, at the will of the operator, to exert pressure upon the coal transversely of the kerf. By such transverse pressure the coal is loosened along the planes of its natural cleavage which greatly assists in its dislodgment by the pick mechanism. Each of the above mentioned hydraulic jacks consists of a cylinder 145 mounted in an aperture of the plate 20, in which is slidable the plunger 146. The plunger 146 is provided with a packing washer 147 secured in place by a clamping ring 148 in the manner common in hydraulic plunger construction. The parts are so proportioned that when the plunger 146 is withdrawn into the cylinder 145 the over all length of the jack will be less than the width of the kerf to allow its free insertion into the kerf. When however the plunger is pushed to the outer limit of its travel the over all length of the jack will be materially greater than the width of the kerf allowing a considerable yielding of the coal within the effective range of the jack. Attached to the plunger 146 and to the cylinder 145 is a retracting spring 149 by which the plunger is withdrawn into the cylinder when the pressure of the actuating fluid is relieved. A plurality of apertures 150 formed in the walls of the cylinder 145 limit the outward movement of the piston by allowing the escape of the actuating fluid. Formed in the body of the cylinder 145 is an aperture 151 into which is screw threaded a pipe coupling 152 by which the supply tube 153 is connected for the admission of the fluid by which the jack is energized. The tube 153 is carried rearwardly along the face of the plate 20 and is connected with a suitable pressure pump 154 bolted to the part 51 of the main frame of the machine. The pressure pump 154 has a piston 155 which is connected through the connecting link 156 with the rocker arm 157. The rocker arm 157 is attached to the projecting end of the trunnion 89 of the rocker arm 87 the oscillation of which actuates the piston 155 of the pressure pump. A supply tube 158 extends from the pressure pump 154 to the slack tank 159 which is adapted to contain the supply of fluid for the energizing of the jacks. A suitable controlling valve 160 is provided by which the flow of fluid from the pump is controlled. By the manipulation of the valve 160 fluid may be caused to flow into either of the jacks to energize them, may be retained in the jacks to maintain the pressure exerted thereby, or may be allowed to return to the slack tank to permit the withdrawal of the plunger into the cylinder.

The main conveyer for the machine is of the endless chain and scraper type, and extends over substantially the entire width and the entire length of the main frame. The conveyer is shown in Figs. 3, 4, 8, 9, 12, and 17. It comprises two endless chains 161 which are joined at intervals by cross bars 162 which act as scrapers. At the rear end of the machine the chains 161 pass around sprocket wheels 163 on the transverse drive shaft 164 which is mounted in the bearings 165. The bearings 165 are of the take up type commonly used in conveyer practice and are slidable in longitudinal slots of the plates 166 attached to the side plates of the conveyer trough and also to the brackets 167 of the main frame 1. Adjusting screws 168 are provided to move the bearings 165 relative to the plates 166 for the purpose of adjusting the tension of the conveyer chain. At the front of the machine the chains 161 pass around a roller shaft 169 which is journaled in suitable bearings 170 as shown in Fig. 1 bolted both to the side plates of the conveyer trough and to the cutter frame 3. The upper strand of the conveyer travels over the surface of the plate 171 which is connected by means of suitable angle bars 172 with side plates 173. Angle bars 174 are secured to the plate 173 above the upper strand of the conveyer and serve to protect the chains and hold them in position. The lower strand of the conveyer travels over the surface of the plate 175 which is secured to the side plate 173 by means of angle bars 176. The conveyer trough formed by the vertical plates 173 and the horizontal and inclined plates 171 and 173 is a rigid self supporting structure. This trough is supported at its rear end by the plates 166 of the bearings 165 which are bolted both to the side plates 173 and to the brackets 167 of the main frame and at its forward end is supported by the cutter frame 3 to which it is rigidly secured by the bearings 170.

The main conveyer can be readily removed from the other parts of the machine. Ordinarily the roof of the mine is too low to permit the conveyer being lifted off over the sides of the machine, and therefore provision is made for drawing it out at the rear end. The conveyer can be entirely freed from the other parts of the machine by disconnecting the bearings from the main frame, and from the cutter frame. The whole conveyer mechanism can then be drawn directly rearward. Rollers 177 are provided for temporarily supporting the forward parts of the conveyer during such rearward movement.

The rear or swinging conveyer, is indicated by E in Figs. 1 and 2. The active element of this conveyer is of the endless chain and scraper type, and is similar to the active element in the main conveyer. The two chains of this conveyer are indicated by 178, 178 and the transverse scraper elements are indicated by 179. At the rear the chains 178 run over idler sprocket wheels 180 on the transverse shaft 181. At the forward end the chains run over idler sprocket wheels 182 on the transverse shaft 183. The shaft 183 is mounted in suitable bearings in the hopper casting 184. This casting 184 is formed with upward extending flaring walls 185 which are positioned and adapted to receive material discharged from the rear end of the main conveyer. The sprocket wheels 186 engage the lower strand of the conveyer chain 178 to drive the conveyer. The devices for mounting and driving the sprocket wheels 186 will be hereinafter described.

The trough for the swinging conveyer is made up of two sections which are pivoted together for relative movement about a transverse horizontal axis. The forward section of the trough consists of a plate 187, on which the upper strand of the conveyer rests, and the side walls 188 and 189. The lower section 188 of the side walls are continuations of the flaring hopper walls 190, and are formed as integral parts of the main hopper casting 184. The rear part 189 of the side walls of the forward sections of the conveyer trough are secured to the forward part 188 and to the frame work which comprises two pairs of structural steel sections 191 and 192 all of which are bolted or riveted at their forward ends to the main hopper casting 184. Vertical sections 193 connect the sections 191 and 192 near their rear ends. The bottom plate 187 of the trough is connected to the side walls in any usual or preferred manner. As before stated this plate serves to support the forward part of the upper strand of the conveyer. The forward part of the lower strand is supported in part upon the bottom walls of the main hopper casting 184 and in part on the angle bars 195 secured to the frame section 191. The bars 195 terminate some distance from the sprocket wheels 186 and the conveyer element is permitted to sag at this place in order to allow for adjustment of the parts in the manner to be described.

At the rear end of the structural steel members 191 are bearings for a transverse shaft 196. Upon the ends of the shaft 196 are mounted supporting arms 197 to the rear ends of which the trough of the rear section of the conveyer is secured. This trough extends substantially horizontally and is made up of the side plate 198, 198 which flare outward at their upper part, and the transverse plate 199 and 200 for supporting respectively the upper and lower strand of the conveyer. The plates 199 and 200 are secured to the side plates 198 by means of suitable angle bars 201 and 202 and angle bars 203 are attached to the side plates to protect the upper strands of the chains 178 from material traveling in the conveyer trough. The rear transverse shaft 181 is mounted in suitable bearings secured to the side plates 198 of the conveyer trough and can be adjusted longitudinally by means of the screws 204 to regulate the tension of the conveyer chains. To the forward end of the supporting arms 197 are attached rollers 205 over which is roved a rope 206 one end of which is windable upon a transverse winding shaft 207 and the other end after passing around a guide sheave 208 is resiliently attached to the frame member 192. The transverse shaft 207 is journaled in bearings 209 attached to the frame member 192 and is provided with a ratchet wheel 210. Rotatable about the shaft 207 is a hand lever 211 having a pawl 212 adapted to engage the ratchet wheel 210 and a second pawl 213 mounted upon the conveyer frame engages the ratchet to prevent retrograde movement. By the manipulation of the hand lever 211 the shaft 207 may be rotated to wind the rope 206 thereby depressing the forward end of the supporting arm 197 with a corresponding elevation of the rearward end of the conveyer.

214 is a frame casting rigidly secured to the main frame casting 1. At 215 it is provided with a recess in which, by means of a ball bearing 216, there is mounted a pivot pin 217. The upper end of the pivot pin 217 is adapted to extend into a slot in the hopper casting 184, and a head 218 on the pin serves to prevent upward movement of the hopper casting with respect to the frame casting 214. A transverse lock bolt 219 serves to normally hold the hopper casting 184 against longitudinal movement with respect to the pin 217. At 220 are rollers secured to the hopper casting 184, and adapted to rest upon a curved rail 221 which is concentric with the pin 217. It will be clear that the rollers 220 co-operate with the pin at 217 to support the entire swinging conveyer, at the same time permitting free oscillatory movement to one side or the other. The entire swinging conveyer can be readily removed by withdrawing the bolt 219 thus permitting the whole structure to be moved rearwardly to disengage the hopper castings 184 from the head 218 of the pin 217.

Mounted on the rear part of the structural frame work of the swinging conveyer is an electric motor 222 receiving its current through a flexible conductor 223. The armature pinion 225 of the motor meshes with a spur gear 226 on a suitably mounted shaft 227. On the shaft 227 is a worm 228 which meshes with the worm wheel 229 on a transverse shaft 230 which also carries the sprocket wheels 186 before referred to. By means of this mechanism power can be transmitted from the motor 222 to drive the conveyer chains 178 in the direction indicated by the arrows in Fig. 5.

The slack from the main undercutter will be carried backward within the main frame and will not be caught by the main conveyer. In order to pick up the slack and load it with the other coal a supplementary slack conveyer, which is clearly shown in Figs. 7, 8, 12, 13, 14, 15, and 16 is provided. The active element of the slack conveyer is an endless chain 231 to which the laterally extending scraper flights 232 are attached. The chain 231 is composed of welded links 233, formed of round steel rods, interspersed at spaced intervals, with special attachment links 234 having laterally extending hinge members 235. The scraper flights 232 are pivotally connected to these hinge members by suitable hinge pins 236. Springs 237 are provided to rotate the scraper flights forwardly about the hinge pins 236 and shoulder extensions 238 on the hinge members engage the forward surfaces of said flights to limit such forward rotation. By this arrangement the flights 232 are held in position to move the fine coal cuttings along the conveyer trough, while the resiliency of the springs 237 allows the flights to yield and prevent breakage of the parts should fragments of coal or other objects too large to pass through the conveyer trough be engaged by the flights. The chain 231 passes over a drive sprocket wheel 239 mounted underneath the rear end of the main conveyer for rotation about a vertical axis. At the forward end the chain 231 passes around an idler sprocket wheel 240 which is mounted in a bracket 241 slidable longitudinally of the machine in such position that the flights 232 may engage the coal cuttings from the pan or sub-base 2 near the point where they are dropped by the cutter bits of the cutter chain. The flights 232 push the cuttings onto an inclined trough 242 and finally discharge them into the main hopper casting which receives the coal from the main conveyer. A similar trough 243 is provided for supporting the return strand of the conveyer element. The head sprocket 239 is journaled on a stud 244 which is integral with the casting 245 secured to the main frame 1 by means of bolts 246 which also hold the plate 247 in place. A washer and cap screw 248 holds the sprocket wheel 239 in place. The front sprocket wheel 240 is journaled on the stud 249 of the casting 241 and is held in place by means of a suitable guard 250. The casting 241 is supported for limited movement longitudinally of the machine by an extension 251 which engages a suitable guide way formed on the main casting 1. It is held against forward movement by the tension on the chain and against rearward movement by the screw 252. The rear part of the troughs 242 and 243 are supported by means of angle bars 253 and other angle bars 254 are arranged parallel to the bars 253 and co-operate with them to form guides for the chain 231. The bars 253 and 254 are secured at their rear end to the parts 245 and 247 and at their forward end to the castings 255 and 256. The casting 255 has near its forward end an upward projecting part 257. Cross members 258 and 259 connect the rear parts of the opposite angle bars 253 and 254. The castings 255 and 256 are rigidly connected together and are also rigidly connected to the main frame by means of a foot 260 on the casting 255. The castings 255 and 256 have flanges 261—261 and 262—262 which align with the angle bars 253 and 254 and serve as chain guides. At the lower end of the conveyer are angle bars 263—263 and 264—264. Those on the left hand side as viewed in Fig. 13 are secured to the casting 241 and 250 and those on the right hand side are secured to the castings 255 and 256.

The adjusting screw 252 above referred to is supported in an aperture in the extension 257 and in apertures in the casting 255. It is held against rotation by means of the key 265, which is shown in Fig. 24. 266 is a nut mounted on the screw 252 in a recess formed in the casting 255. This nut 266 has formed upon it a bevel gear adapted to mesh with a similar bevel gear 267. This gear 267 is mounted on a short transverse shaft 268 which is inclined upward and held in a bearing 269 on the main frame. The shaft 268 is squared at its ends, and is adapted to be engaged by a suitable socket wrench by which an operator may turn the shaft 268 and thereby turn the nut 266 to adjust the screw 252 longitudinally of the conveyer and with it the sprocket wheel 240 to change the tension upon the conveyer chain 231.

The pan or sub-base 2 upon which the main frame of the machine slidably rests is composed of a bottom plate 270 and side plates which are formed of angle bars 271 and 272. The inner edges of the horizontal flanges of the angles 271 and 272 are positioned to engage the sides of the main frame casting 1 and to form a guide way for it.

The main frame is moved to advance the cutting and breaking down mechanisms into the coal by means of the rope controlled devices which will be described. These are shown in Figs. 17 and 18. For feeding the machine forward a feed rope 275 is provided, which is connected to be wound upon a drum 276 mounted on the main frame 1. From the drum 276 the rope extends over a sheave 277 mounted on the main frame, and over a sheave 278 mounted at the forward end of the pan 2. After passing around the sheave 278 the rope extends backward to a sheave 279, mounted on the main frame, and across the machine to a similarly mounted sheave 280. From the sheave 280 the rope extends forward to a point of attachment 281 at the front end of the pan. It will be clear that when the drum 276 is rotated the rope 275 will cause the main frame and attached parts to move forward with respect to the pan, the tractive force being divided between the two sides.

282 is a rope for pulling the main frame and attached parts backward with respect to the pan. This rope is connected to a winding drum 283, and from the drum extends backward between two guide pulleys 284, 284. From the pulleys 284 the rope can extend to either the right or the left and can be secured to one or the other of the hooks 285—285 as shown in Fig. 18. It will be clear that when the drum 283 is rotated the rope 282 will act directly to pull the main frame and attached parts backward. The hooks 285 are secured to or formed as parts of the castings 286 mounted at the rear corners of the pan 2. These castings 286 are provided with rearward extending lugs 287 adapted to be engaged by lifting jacks, or crow bars for handling the machine and assisting in moving it about the mine. Mounted on the castings 286 are sheaves 288 over which the rope 282 can be passed when it is to be used for moving the machine as a whole laterally or otherwise in a manner to be hereinafter described.

The drums 276 and 283 are mounted for rotation upon two stationary vertical shafts 289 and 290 the bottom ends of which are threaded into castings 291 and 292 suitably secured to the bottom wall of the main frame casting 1. The upper ends of the shaft 289 and 290 are fitted into apertures of the plate 293 and are secured against rotation in any preferred manner, as by cotter pins 294.

Freely journaled upon the shafts 289 is a sleeve 295 and upon this sleeve the drum 276 is journaled. The drum 276 and sleeve 295 are connectable by the discs 296 of a multiple disc friction clutch contained within the body of the drum. The drum 276 is supported upon a ball bearing 297 which rests upon the hub 298 of the operating lever 299. The underside of the hub 298 is formed with inclined surfaces adapted to co-operate with similar surfaces formed upon the casting 291 in such manner that by the rotation of the lever 299 in one direction about the shaft 289 the drum 276 will be lifted, thereby pressing the clutch discs 296 together to cause the transmission of power from the sleeve 295 to rotate the drum 276. When the lever 299 is rotated in the opposite direction the drum will be lowered to release the clutch. Upon the shaft 290 is freely journaled a sleeve 300 and upon this sleeve the drum 283 is journaled. The drum 283 and sleeve 300 are arranged to be connected by the discs 301 of the friction clutch contained within the drum 283. The drum 283 is supported upon a ball bearing 302 which rests upon the hub 303 of the operating lever 304 the construction of which is similar to the lever 299. By the rotation of the lever 304 the drum 283 is elevated or lowered to connect or disconnect the drum 283 and the sleeve 300. Attached to the upper part of the sleeve 300 is a spur gear 305 which is engaged by a spur gear 306 attached to the upper part of the sleeve 295 and to the spur gear 305 is attached a worm gear 307 which is engaged by the worm 308 connected to receive power in a manner to be later described. By the rotation of the worm 308 the worm wheel 307 is driven to drive the two sleeves 295 and 300 to operate the winding drums 276 and 283.

The operating levers 299 and 304 are connected together by means of a link 309. Spring balancing devices are provided to normally hold both levers in position to disengage both friction clutches. Connected to the hub 303 at 310 is a transversely slidable reach rod 311 on which are formed upstanding lugs 312 and 313 having apertures to receive the transverse bars 314 and 315 which are mounted between the parts 316 and 52 of the machine frame casting 1. A spring 317 is interposed between the lug 312 and the flange 52, and a similar spring 318 is interposed between the lug 313 and the rib 316. The two springs oppose each other and tend to hold the rod 311 in central position and consequently to hold the hubs 298 and 303 in the central positions. Attached to the lever 304 is a chain 319 which passes over the guide 320 and is wrapped around one end of a transverse shaft 322, which is mounted in the main frame, the end of the chain being secured to a collar 323 on the shaft. A chain 324 is secured to the lever 299 at 325 and bears against a segment 326 formed on the side of the lever. The chain 324 passes over the guide 327 and is wound upon the other end of the shaft 322, being secured to the collar 328. The chain 324 is wrapped in the opposite direction from the chain 319. The shaft 322 is supported at the right hand end, looking towards the front of the machine, by means of the collar 323 which rests in a bearing aperture of the main frame. The other end of the shaft rests directly in a suitable aperture formed in the other side of the main frame. A hand wheel 329 is keyed to the left hand end of the shaft, and by means of this hand wheel the shaft may be turned to actuate the chains. To the hand wheel 329 is attached a ratchet wheel 330 which is clearly shown in Figs. 19 and 25. This ratchet wheel is adapted to engage with either end of a double acting pawl 331 which is pivoted upon the stud 332 threaded into the main frame of the machine. Formed on the pawl 331 is a lug 333 to which is pivotally attached a rod 334 adapted to slide in an aperture of the angle 335 attached to the machine frame. Between the angle 335 and the lug 333 is interposed a compression spring 336 the upward pressure of which upon the lug 333 tends to hold either end of the pawl in contact with the ratchet wheel. The pawl is also provided with an upwardly extending arm on which is formed the handle 337 by which the pawl may be manipulated. A pin 338, slidable in an aperture of the handle 337, is held in contact with the main frame casting by the compression spring 339 to serve as a drag to hold the pawl 331 in its central or disengaged position.

When the operator desires to feed the machine forward to cause the cutting and breaking down mechanism to advance into the coal he turns the shaft 322 by means of the hand wheel 329 in a direction to wind the chain 324 thus engaging the clutch which controls the feed drum 276. As soon as the shaft has been turned sufficiently to engage the clutch the pawl 331 is turned to engage the ratchet wheel 330 to prevent the shaft from rotating in a direction to unwind the chain. When it is desired to discontinue the advance of the cutting and breaking down mechanism the operator moves the pawl 331 to a central, or disengaged, position allowing the shaft to freely revolve under the influence of the spring balancing mechanism thereby disengaging the clutch which controls the feed drum 276. To retract the operative parts the operator turns the hand wheel to rotate the shaft 322 in a direction to wind the chain 319 to cause the engagement of the clutch for the pull back drum 283, it being assumed that the pull back rope 282 is connected to one of the hooks 285. As soon as the clutch is engaged the pawl 331 is moved to the position to prevent the rotation of the shaft in a direction to unwind the chain 319 and thus hold the clutch engaged. As soon as the parts reach the desired limit of travel the pawl 331 will be again moved to the central position allowing the disengagement of the clutch by the spring balancing mechanism.

Power to operate the entire machine, with the exception of the rear swinging conveyer which is driven by the motor 222, is derived from the electric motor 340. An electric controller 341 of any preferred construction is mounted upon the left hand side of the machine, convenient to the hand of the operator, for the control of this motor, and suitable resistance units 342 are conveniently placed upon the frame of the machine. Current to actuate the motor is received from a suitable source of electric current supply through a flexible cable 343 provided with a terminal plug 344 by which it can be conveniently connected with the circuits of the machine. Suitable safety fuses are provided within the fuse box 345. Suitable conductor cables 346 and 347 connect the various elements together in a manner well understood by those skilled in the art.

To the armature shaft of the motor 340 is attached a bevel pinion 349 which meshes with the master bevel gear 350 keyed to the vertical shaft 351. The vertical shaft 351 is journaled in the bearing 352 of the main frame, the weight of the shaft and gears being supported by the ball bearing 353. These parts are shown in Fig. 12. To the lower end of the shaft 351 is fixed the sprocket wheel 11 by which the cutter chain 8 is actuated. Formed on the hub of the gear 350 is a smaller bevel gear 354 which meshes with a similar bevel gear 355 on a transverse shaft 356. The shaft 356 is mounted in bearings 357, 358, and 359 formed in a plate 360 secured to the main frame. Loosely mounted on the ends of the shaft 356 are the sprocket wheels 31, 31 for the shearing cutter chains 27, 27. Keyed to the shaft 356 at points adjacent the sprocket wheels 31 are hubs 362 having flanges 363. These flanges are apertured at intervals and corresponding apertures are formed in the sprocket wheels 31. Slidable longitudinally of the hubs 362 are clutch members 363 having clutch pins 364 adapted to be moved through the apertures in the flanges 363 and into the apertures in the sprocket wheels 31, thus serving to connect the sprocket wheels to the shaft. Annular grooves are formed in the clutch members 364 and these are engaged by lugs upon the operative levers 365 and 366 pivotally attached to the frame of the machine. By the movement of these clutch levers 365 and 366 the clutch pins may be caused to engage or disengage the sprocket wheel 31. The lever 366 upon the right hand side of the machine is provided with a rod 367 which extends across the machine and is attached to an operating handle 368 within convenient reach of the operator upon the left hand side of the machine.

A spur pinion 369 keyed to the shaft 356 meshes with a spur gear 370 which is preferably formed integral with a transverse shaft 371. The shaft 371 is journaled in a bearing 372 attached to the main frame 1. The crank pin 373 for the connecting rod 94 by which the pick mechanism is actuated is mounted upon the gear 370, preferably being formed integral therewith as shown in Fig. 13. Keyed to the shaft 371 is a bevel gear 374 which meshes with a similar bevel gear 375 on a longitudinally extending sleeve 376. The sleeve 376 is freely mounted on a longitudinal shaft 377 which is supported in the bearings 378 and 379. The sleeve 376 is connected with the shaft 377 by means of a multiple disc friction clutch which comprises a driven member 380 secured to the shaft, and discs 381 alternately secured to the sleeves 376 and the driven member 380. The pressure between the discs 381 can be adjusted by means of a nut 382 screw threaded on an extension of the driven member and arranged to engage the pins 383 which bear upon the clutch discs 381.

Keyed to the shaft 377 is a hub 384 which forms the driving member of a second friction clutch. Journaled on the shaft 377 adjacent the hub 384 is a driven member 385 upon which is formed the drum 70 on which the rope 68 is windable to control the vertical adjustment of the pick mechanism.

Extending across the machine, and journaled in suitable apertures 386 in the side parts of the main frame, is a shaft 387 to the left hand end of which is secured an upwardly extending lever 388 by which the shaft may be oscillated. Mounted on the shaft 387 is an eccentric 389 which engages the eccentric rod 390. The rod 390 is connected at its forward end to a lever 391 which is pivotally mounted on a bracket 392 secured to the motor frame. The lever 391 is forked at its lower end and engages a ball bearing 393 on the shaft 377 between the lever and the driven member 385. Friction clutch discs are interposed between the driving and driven members 384 and 385 and by grasping the lever 388 the operator can, by means of the mechanism just described, move the member 385 longitudinally of the shaft to force the clutch discs firmly into contact causing the drum 70 to be rotated.

Figure 11:
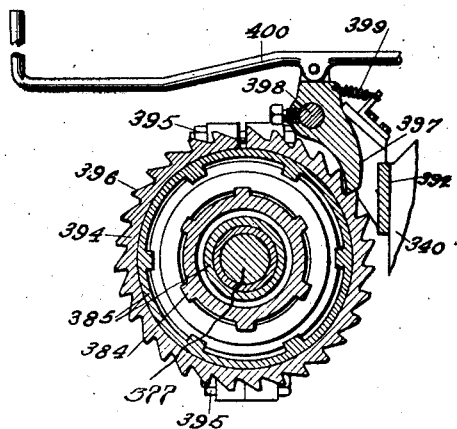
Fig. 11 is a sectional view of a part of the controlling apparatus for the breaking down mechanism.

Embracing the outer surface of the driven member 385 is a friction member 394, which is clearly shown in Fig. 11. The tension on this friction member can be adjusted by means of the bolts 395. On the outer surface of the friction member 394 are formed ratchet teeth 396 adapted to be engaged by a pawl 397. The pawl 397 is mounted on a pivot pin 398 supported in lugs of the casting 392 secured to the casing of the motor. A spring 399 tends to hold the pawl in operative position and a rod 400 is provided which extends across the machine, and can be grasped at either end by the operator to release the pawl.

When it is desired to elevate the pick mechanism the operator moves the lever 388 forward, thus clutching the drum 70 to the shaft 377 causing the rope 68 to be wound. This rope acts through the train of pulleys and the arms 53 and 54 to elevate the mechanism. When the desired elevation is reached the pawl 397 engages the ratchet teeth on the friction band 394 and prevents the unwinding of the rope and the consequent dropping of the pick mechanism. When it is desired to lower the pick mechanism the drum is rotated sufficiently by means of the clutch to release the stress upon the pawl which can then be lifted by means of the rod 400. The clutch is then partially released and the pick mechanism is lowered by gravity under the control of the clutch. The friction connection between the friction band 394 and the drum serves as a safety device to prevent the breakage of the parts should the operator fail to properly control the mechanism by means of the clutch and pawl.

Keyed to the shaft 377 near its rear end is the worm 308 which engages the worm wheel 307 for driving the rope drums 276 and 283. There is also mounted upon the shaft 377 a bevel gear 401 which meshes with a bevel gear 402 attached to the sprocket wheel 239 of the slack conveyer. The bevel gear 401 is also engaged by a second bevel gear 403 mounted upon a transverse shaft 404 journaled in a bearing 405 of the main frame and in a sleeve 406 which is journaled in a bearing 407 of the main frame. The sleeve 406 is adapted to be connected to the shaft 404 by a jaw clutch 408 splined to the shaft and slidable thereon by means of a shifting fork 409. The shifting fork 409 is attached to an operating rod 410 which extends across the machine and is connected to an operating lever 411 convenient to the hand of the operator. Mounted for free rotation upon the shaft 404 is a sprocket wheel 412 which is provided with apertures adapted to register with apertures in the sleeve 406. Wooden pins 413 inserted in the apertures of the sprocket wheel 404 and the sleeve 406 operatively connect these parts. The sprocket wheel 412 is connected by an endless chain 414 with the sprocket wheel 415 upon the head shaft 164 of the main conveyer to drive it. Should the chains 161 or cross bars 162 of the main conveyer become fouled with other parts of the machine or with material in the conveyer the wooden pins 413 will shear thereby protecting the parts of the machine from injury.

The pull back rope 282 is used to move the machine bodily from place to place. When so used the rope is detached from the hook 285 and a sufficient amount is unwound to permit it to be attached to a suitable jack, or other stationary object, or to be passed around pulleys on jacks such as those indicated at 417 and 418. At 419, as shown in Figs. 2 and 9, holes are provided for the attachment hooks such as that indicated at 420. By means of such hooks the rope 282 can be attached to the front end of the machine or to other parts.

In operating the machine it is first placed in a position near one rib of the room as indicated in Fig. 36. Preferably the forward end of the machine is inclined away from the room axis. A suitable jack 421 may be placed against the pan 2 to prevent its movement during the operation of the machine, the position, number and arrangement of such jacks depending upon local conditions and the preference of the operator. The main motor 340 is then started and by means of the above described power transmitting devices the undercutting and shearing cutter chains, the main and slack conveyers, and the driving pistons for the pick mechanism are started. A pit car 422 is suitably placed upon the track in the rear of the machine, the swinging conveyer laterally adjusted to bring its discharge end above the car, and the motor 222 is started to start the swinging conveyer. The operator by turning the hand wheel 329 causes the engagement of the clutch which drives the drum 276 to wind the feed rope 275 and the whole mechanism is caused to advance bodily with respect to the pan 2. The cutters 9 engage the coal face and form a horizontal kerf near the floor of the mine into which the main conveyer is carried, and the cutters 28 form parallel vertical kerfs extending upward in the coal from the sides of the horizontal kerf.

When the cutting mechanism has advanced a sufficient distance into the coal body the pick mechanism will be adjusted to engage the coal face at points relatively near the horizontal kerfs, so as to break down fragments of coal of a size convenient for transportation. After breaking off the lower part of the coal face the lever 388 will be manipulated to elevate the pick mechanism a sufficient amount to break off a second increment, and so on until the picks have reached the roof of the mine. During the time consumed by the successive attacks upon the coal face the cutting mechanism will have advanced a considerable distance into the coal body and more or less difficulty may be experienced if the picks are not withdrawn rearwardly of the machine a sufficient amount to prevent their engagement with the overhanging portions of the coal while said picks are being lowered for further attack upon the face. After the upper part of the coal has been broken down the operator moves the lever 105 to hold the hook 96 out of engagement with the roller 95, allowing the pick frame $C^3$ to move regularly with the reciprocating frame $C^2$. As the frame $C^3$ reaches the rearward limit of its reciprocation the lever 136 is rotated to cause the disengagement of the latch bolts 123 and 124 and at the same time to cause the brake flange 143 to frictionally engage the angle bar 117. The frame $C^3$ will thus be released from the frame $C^2$ and will be held against forward movement by the brake flange 143. When the oscillating frame $C^2$ has moved a sufficient distance in its forward oscillation, the lever 136 is rotated to cause the engagement of the latch bolts 123 and 124 with preferred notches 122 forward of the notches formerly engaged. The reciprocating pick mechanism will thereby be shortened to prevent engagement with the coal during downward adjustment. When the desired elevation has been attained the frame $C^3$ may be adjusted forwardly in like manner, the lever 105 may then be moved to allow the re-engagement of the hook 96, and the operation proceed as before. By the proper manipulation of the pick mechanism as above described the coal may be broken into fragments of suitable size for transportation, and these fragments fall upon the main conveyer by which they are carried backward and dumped into the hopper 184. From the hopper 184 the swinging conveyer carries the coal upward and backward and discharges it into the pit car 422. The cutting and conveying mechanism is entirely automatic after once being started and the operator can devote his entire attention to controlling and regulating the operation of the breaking down mechanism. It is obvious that the breaking down of the coal requires considerable care not only to prevent too rapid breaking and the consequent choking of the conveyer but also to prevent too slow breaking which would permit the cutters to get too far ahead of the picks.

Under some circumstances, when the coal does not break with sufficient freedom, the auxiliary hydraulic breaking jack may be used to assist in breaking up coal. By the manipulation of the valve lever 160 water may be admitted to the cylinder 145 causing the piston 146 to exert a pressure transversely of the coal body, shattering the coal along the planes of its natural cleavage which assists materially in breaking down the coal.

The cutting, breaking down and carrying away of the coal continues in the manner described until the machine reaches the extreme limit of its forward movement, as shown in Fig. 37 when the operator, by manipulation of the hand wheel 329 releases the clutch of the feed drum 276 and engages the clutch of the pull back drum 283 and retracts the machine. The machine is then ready to be moved to a new position. To accomplish this the rope 282 is arranged as shown in Fig. 38, it being passed over the pulleys secured to the jacks 417, 418, and secured at its free end to the hook 420 at the forward end of the pan 2. The drum 283 is then set in motion and the rope wound with the result that the machine is pulled laterally into the position shown in Fig. 38. The jack 421 is again placed to hold the pan in position and the mining operation as above described may be repeated. This series of operations can be repeated until the machine reaches the position shown in Fig. 39 in which it is inclined oppositely from the position shown in Fig. 36. This outward inclining of the machine serves to keep the width of the room substantially constant as the machine advances.

When the last cut is finished the jack 421 is removed and a jack 423 is set near the face of the coal on the free side of the machine. The rope 282 is then transferred to the free side of the machine, carried forward over a snatch block 424 attached to the forward corner of the pan. The drum 283 is then set in motion and the whole machine is moved bodily forward until the forward ends of the cutting mechanism engage the coal after which the pan 2 will be drawn forward under the bed frame of the machine to place the machine in condition to begin the next sumping cut as shown in Fig. 41. When the next series of cuts is completed the machine will be back in a position such as is indicated in Fig. 36, and the whole cycle of operations can be repeated at will.

It will be understood that use may be made in handling the machine of skids, jacks, rails, etc., such as may be necessary to meet local conditions. At 425 I have provided a head light which is so positioned that its beams are at all times directed upon the coal face at the point of attack. The use of such devices, however is so well understood by mine engineers, and mine operators, that detailed description is not thought to be necessary at this time.

It will also be understood that suitable shields and guards may be provided for the various operative parts of the machine to protect the operatives against injury by accidental contact with the moving parts. A guard for the shearing chain is indicated at 426 and other guard devices have been omitted from the drawings for the sake of clearness.

What I claim is

1. In a machine for cutting, breaking down and loading coal, the combination of a carriage movable relative to the coal body, simultaneously operable cutting mechanism, breaking down mechanism and loading mechanism mounted upon the carriage to be moved therewith into operative relation with the coal, said breaking down mechanism comprising cooperating pressure exerting devices and impact devices adapted to be simultaneously actuated to engage the same working face to dislodge the coal.

2. In a machine for cutting, breaking down and loading coal, the combination of a carriage movable relative to the coal body, simultaneously operable cutting mechanism, breaking down mechanism and loading mechanism mounted upon the carriage to be moved therewith into operative relation with the coal, said breaking down mechanism comprising pressure exerting devices and impact devices adapted to be actuated either simultaneously or independently to engage the coal in front of the machine to dislodge it.

3. In a machine for cutting, breaking down and loading coal, the combination of a carriage movable relative to the coal body, simultaneously operable cutting mechanism, breaking down mechanism and loading mechanism mounted upon the carriage to be moved therewith into operative relation with the coal, said breaking down mechanism comprising reciprocating coal engaging elements and pressure exerting elements adapted to simultaneous actuation to engage the coal in front of the machine to dislodge it.

4. In a machine for cutting, breaking down and loading coal, the combination of a carriage movable relative to the coal body, simultaneously operable cutting mechanism, breaking down mechanism and loading mechanism mounted upon the carriage to be moved therewith into operative relation with the coal, said breaking down mechanism comprising reciprocating coal engaging elements and pressure exerting elements adapted to be actuated either simultaneously or independently to engage the coal in front of the machine to dislodge it.

5. In a machine of the class described, the combination with a carriage movable forward and backward relative to a coal body, of means carried by the carriage for breaking down the coal comprising devices adapted to exert pressure upon the coal to be dislodged in a direction transversely of the movement of the carriage, and simultaneously operable devices adapted to impact with said coal along lines parallel with the direction of movement of the carriage.

6. In a machine of the class described, the combination with a carriage movable forward and backward relative to a coal body, of means carried by the carriage for breaking down the coal comprising devices adapted to exert pressure upon the coal to be dislodged in a direction transversely of the movement of the carriage, and reciprocating coal engaging elements adapted to be actuated simultaneously with the pressure exerting devices to strike said coal along lines parallel with the movement of said carriage.

7. In a machine of the class described, the combination with a carriage movable forward and backward relative to a coal body, of means carried by the carriage for breaking down the coal comprising hydrostatically actuated devices adapted to exert pressure upon the coal to be dislodged in a direction transversely of the movement of the carriage, and reciprocating coal engaging elements adapted to be actuated simultaneously with the pressure exerting devices to strike the coal along lines parallel with the movement of the carriage.

8. In a machine of the class described, the combination with a carriage movable forward and backward relative to a coal body, of means carried by the carriage for breaking down the coal comprising devices adapted to exert pressure upon the coal to be dislodged in a direction transversely of the movement of the carriage, and simultaneously operable devices adapted to impact with the said coal along lines parallel with the direction of movement of the carriage, and simultaneously operating devices to receive and remove the coal as it is broken down.

9. In a machine of the class described, the combination with a carriage movable forward and backward relative to a coal body, of means carried by the carriage for breaking down the coal comprising devices adapted to exert pressure upon the coal to be dislodged in a direction transversely of the movement of the carriage, and reciprocating coal engaging elements adapted to be actuated simultaneously with the pressure exerting devices to strike said coal along lines parallel with the movement of the carriage, and devices operable simultaneously with the breaking down mechanism to receive and remove the coal as it is broken down.

10. In a machine of the class described, the combination with a supporting frame, of coal cutting, loading, and dislodging devices mounted upon said frame, means to move said frame relative to the coal face to feed said devices to their work, said dislodging devices including pick mechanism adapted to reciprocation longitudinally of the machine to engage the coal to break it down, means to adjust the pick mechanism vertically, means to reciprocate said pick mechanism, and means supplemental to said reciprocating means to longitudinally adjust said pick mechanism relative to said cutting and loading devices.

11. In a machine of the class described, the combination with a supporting frame, of coal cutting, loading, and dislodging devices mounted upon said frame, means to move said frame relative to the coal face to feed said devices to their work, said dislodging devices including longitudinally extending guide members pivotally attached to said frame for oscillation in vertical planes, a frame reciprocable longitudinally of said guide members, a pick mechanism carried by said reciprocating frame and adapted to engage the coal to break it down, and means to elongate and contract said reciprocating frame to adjust the position of said pick mechanism relative to said cutting and loading devices.

12. In a machine of the class described, the combination with a supporting frame, of coal cutting, loading, and dislodging devices mounted upon said frame, means to move said frame relative to the coal face to feed said devices to their work, said dislodging devices including longitudinally extending guide members pivotally attached to said frame for oscillation in vertical planes, a frame reciprocable longitudinally of said guide members, a supplemental frame carried by said reciprocable frame, pick mechanism attached to said supplemental frame, and means to adjust the position of said supplemental frame longitudinally of said reciprocable frame.

13. In a machine of the class described, the combination with a supporting frame, of coal cutting, loading, and dislodging devices mounted upon said frame, means to move said frame relative to the coal face to feed said devices to their work, said dislodging devices including an element adapted to reciprocation longitudinally of the machine, a coal engaging element, and means to operatively connect said coal engaging element with said reciprocating element in either of several positions of adjustment longitudinally of the machine.

14. In a machine of the class described, the combination with a supporting frame, of coal cutting, loading, and dislodging devices mounted upon said frame, means to move said frame relative to the coal face to feed said devices to their work, said dislodging devices including a reciprocating element and a coal engaging element mounted in a guide frame, devices carried by the guide frame to operatively connect the coal engaging element with the reciprocating element in either of several positions of longitudinal adjustment, and means to hold said coal engaging element against reciprocation.

15. In a machine of the class described, the combination with a supporting frame, of coal cutting, loading, and dislodging devices mounted upon said frame, means to move said frame relative to the coal face to feed said devices to their work, said dislodging devices comprising longitudinally extending guide members pivotally attached to said supporting frame for oscillation in vertical planes, a frame adapted to reciprocation in said guide members, a coal engaging element carried by the reciprocating frame, and means operable during the reciprocation of said frame to adjust the coal engaging element longitudinally of the reciprocating frame.

16. In a machine of the class described, the combination with cutting mechanism adapted to be moved inwardly to form a kerf in the coal body, of reciprocating breaking down mechanism adapted to engage the coal above the kerf to dislodge it, means to adjust the breaking down mechanism either upwardly or downwardly, and means supplemental to the reciprocating means to adjust said breaking down mechanism either inwardly or outwardly relative to the cutting mechanism.

17. In a machine of the class described, the combination with a supporting frame, of coal cutting, loading, and dislodging devices mounted upon said frame, means to move said frame relative to the coal face to feed said devices to their work, said dislodging devices comprising longitudinally extending guideways, a frame adapted to reciprocation longitudinally of said guideways, means to reciprocate said frame, secondary guideways formed in said reciprocating frame, a percussive coal engaging element longitudinally slidable in said secondary guideways, and means to lock said percussive element in either of several positions of longitudinal adjustment in said secondary guideways.

18. In a machine of the class described, the combination with a supporting frame, of coal cutting, loading, and dislodging devices mounted upon said frame, means to move said frame relative to said coal face to feed said devices to their work, said dislodging devices comprising longitudinally extending guideways, a frame adapted to reciprocation longitudinally of said guideways, means to reciprocate said frame, secondary guideways formed in said reciprocating frame, a percussive coal engaging element longitudinally slidable in said secondary guideways, means to lock said percussive element in either of several positions of longitudinal adjustment in said secondary guideways, and means within convenient control of the operator to disengage said locking means.

19. In a machine of the class described, the combination with a supporting frame, of coal cutting, loading, and dislodging devices mounted upon said frame, means to move said frame relative to the coal face to feed said devices to their work, said dislodging devices comprising longitudinally extending guideways, a frame adapted to reciprocation longitudinally of said guideways, means to reciprocate said frame, secondary guideways formed in said reciprocating frame, a percussive coal engaging element longitudinally slidable in said secondary guideways, means to lock said percussive element in either of several positions of longitudinal adjustment in said secondary guideways, and means operable during the reciprocation of said frame to disengage said locking means.

20. In a machine of the class described, the combination with a supporting frame, longitudinally extending guideways mounted upon said frame, a frame adapted to reciprocation longitudinally of said guideways, means to reciprocate said frame, secondary guideways formed in said reciprocating frame, a percussive coal engaging element longitudinally slidable in said secondary guideways, a locking bolt movable transversely of said coal engaging element and adapted to engage either of several recesses in said secondary guideways, and means to move said locking bolt as and for the purpose set forth.

21. In a machine of the class described, the combination with a supporting frame, longitudinally extending guideways mounted upon said frame, a frame adapted to reciprocation longitudinally of said guideways, means to reciprocate said frame, secondary guideways formed in said reciprocating frame, a percussive coal engaging element longitudinally slidable in said secondary guideways, a locking bolt movable transversely of said coal engaging element and adapted to engage either of several recesses in said secondary guideways, and means operable during the reciprocation of said reciprocating frame to move said locking bolt as and for the purpose set forth.

22. In a machine of the class described, the combination of cutting mechanism adapted to form a kerf in the coal body, hydraulic means to shatter the coal adjacent the kerf, means to dislodge the shattered coal, and conveying mechanism in position to receive the coal as it is dislodged, all of said devices being simultaneously operable and co-operating to break down and load the coal.

23. In a machine of the class described, the combination with cutting mechanism adapted to form a kerf in a coal body, of hydraulic means to shatter the coal adjacent the kerf, reciprocating pick mechanism to dislodge the shattered coal, and conveying mechanism in position to receive the coal as it is dislodged, all of said devices being simultaneously operable and co-operating to break down and load the coal.

24. In a machine of the class described, the combination with cutting mechanism adapted to form a kerf in the coal body, of hydraulic means to shatter the coal adjacent the kerf, and simultaneously operable means to dislodge the shattered coal.

25. In a machine of the class described, the combination with cutting mechanism adapted to form a kerf in the coal body, of hydraulic means to shatter the coal adjacent the kerf, and simultaneously operable reciprocating pick mechanism to dislodge the shattered coal.

26. In an apparatus for dislodging coal from its native bed, the combination with impact devices adapted to impinge upon the surface of the coal, of means in advance of said impact devices to exert pressure upon said coal along lines transversely of the direction of said impact devices.

27. In an apparatus for dislodging coal from its native bed, the combination with impact devices adapted to impinge upon the surface of said coal, of means in advance of said impact devices for creating strains in the body of said coal adjacent the point of contact and transversely of the direction of said impact devices.

28. In an apparatus for dislodging coal from its native bed, the combinaion with impact devices adapted to impinge upon the surface of the coal, and means insertible in the coal body in advance of said impact devices adapted to exert pressure upon said coal along lines transversely of the direction of said impact devices.

29. In a machine of the class described, the combination with a supporting frame, of coal cutting, loading, and dislodging devices mounted upon said frame, means to move said frame relative to said coal face to feed said devices to their work, said dislodging devices including a reciprocating element and a coal engaging element mounted in a guide frame, devices carried by the guide frame to operatively connect the coal engaging element with the reciprocating element in either of several positions of longitudinal adjustment, and means operable during its reciprocation to disconnect said coal engaging element from said reciprocating element.

30. In a machine of the class described, the combination of a movable support, cutting mechanism, breaking down mechanism, and loading mechanism mounted upon said support and adapted to be moved therewith into operative relation to the coal, and means for simultaneously operating said mechanisms, said breaking down mechanism comprising pressure exerting devices and impact devices being operable along lines substantially at right angles to each other to engage the coal and dislodge it.

31. In a machine of the class described, telescoping frames, comprising a main supporting frame, an intermediate frame reciprocating relative to said main frame and an end impacting frame and means for engaging said end frame with either said main frame or said reciprocating frame for rendering it independent of the other.

32. In a machine of the class described, telescoping frames, comprising a main supporting frame, an intermediate frame reciprocating relative to said main frame, and an end impacting frame, means for locking said end frame and said reciprocating frame whereby the movement of the latter is imparted to the former, means for releasing said locking means, and means for preventing relative movement of said end frame to said main frame during such release of said locking means.

In testimony whereof, I affix my signature.

NILS D. LEVIN.